United States Patent
Sanders

(10) Patent No.: US 11,633,835 B2
(45) Date of Patent: Apr. 25, 2023

(54) SYSTEMS FOR MANAGING ABRASIVE MEDIA IN CAVITATED FLUID

(71) Applicant: The Boeing Company, Chicago, IL (US)

(72) Inventor: Daniel G. Sanders, Cle Elum, WA (US)

(73) Assignee: The Boeing Company, Arlington, VA (US)

( * ) Notice: Subject to any disclaimer, the term of this patent is extended or adjusted under 35 U.S.C. 154(b) by 1132 days.

(21) Appl. No.: 16/221,019

(22) Filed: Dec. 14, 2018

(65) Prior Publication Data
US 2020/0189068 A1 Jun. 18, 2020

(51) Int. Cl.
| | | |
|---|---|---|
| *B24C 1/10* | (2006.01) | |
| *B24B 31/00* | (2006.01) | |
| *C21D 7/06* | (2006.01) | |
| *G01N 9/36* | (2006.01) | |
| *B01F 23/50* | (2022.01) | |
| *B01F 25/30* | (2022.01) | |
| *B01F 23/00* | (2022.01) | |

(52) U.S. Cl.
CPC .............. *B24C 1/10* (2013.01); *B01F 23/50* (2022.01); *B01F 25/30* (2022.01); *B24B 31/003* (2013.01); *C21D 7/06* (2013.01); *G01N 9/36* (2013.01); *B01F 23/023* (2022.01); *B01F 23/56* (2022.01)

(58) Field of Classification Search
CPC ................................................... B24B 31/003
See application file for complete search history.

(56) References Cited

U.S. PATENT DOCUMENTS 5,235,179 A * 8/1993 Chang ................... G01F 23/292
 250/575
5,276,998 A * 1/1994 Joen ........................ B08B 3/044
 451/104

(Continued)

FOREIGN PATENT DOCUMENTS

CN 108608338 A 10/2018
DE 102006037069 2/2007

(Continued)

OTHER PUBLICATIONS

U.S. Appl. No. 15/693,401, filed Aug. 31, 2017.

(Continued)

*Primary Examiner* — Sarang Afzali
(74) *Attorney, Agent, or Firm* — Kunzler Bean & Adamson

(57) ABSTRACT

Systems for managing abrasive media in cavitated fluid include a set of sensors in communication with cavitated fluid in a processing tank and a processor coupled to the set of sensors. The processor is configured to determine a density of an abrasive media in the cavitated fluid in the processing tank and facilitate maintaining the density of abrasive media in the cavitated fluid in the processing tank at a level that is greater than or equal to a threshold level of abrasive media. The processor is further configured to command the abrasive media addition device to add the recycled abrasive media to the processing tank to increase the density of abrasive media in the cavitated fluid in response to determining that an average density of abrasive media is less than the threshold density of abrasive media.

20 Claims, 18 Drawing Sheets

(56) References Cited

U.S. PATENT DOCUMENTS

| | | | | |
|---|---|---|---|---|
| 5,460,566 | A * | 10/1995 | Trahan | B24B 31/06 451/328 |
| 6,174,220 | B1 * | 1/2001 | Stametz | B24B 19/16 451/36 |
| 6,341,151 | B1 | 1/2002 | Enomoto et al. | |
| 6,520,837 | B2 * | 2/2003 | Weichert | B02C 23/06 977/773 |
| 6,855,208 | B1 | 2/2005 | Soyama | |
| 7,004,824 | B1 * | 2/2006 | Madanshetty | B24B 37/04 451/910 |
| 8,776,565 | B2 * | 7/2014 | Hatou | B23P 9/04 72/53 |
| 9,200,341 | B1 | 12/2015 | Sanders et al. | |
| 9,770,804 | B2 * | 9/2017 | Byers | B24B 57/02 |
| 10,114,000 | B1 * | 10/2018 | Lewis | G01N 33/28 |
| 2010/0255759 | A1 | 10/2010 | Ohashi et al. | |
| 2013/0104615 | A1 * | 5/2013 | Butler | B24C 3/02 72/53 |
| 2016/0008950 | A1 * | 1/2016 | Quan | B21B 45/08 451/75 |
| 2018/0023153 | A1 * | 1/2018 | Zheng | C22C 38/44 29/90.7 |
| 2019/0061103 | A1 | 2/2019 | Sanders | |
| 2019/0061104 | A1 | 2/2019 | Sanders et al. | |

FOREIGN PATENT DOCUMENTS

| | | |
|---|---|---|
| JP | H04362124 | 12/1992 |
| JP | 2007155544 | 6/2007 |

OTHER PUBLICATIONS

U.S. Appl. No. 15/693,409, filed Aug. 31, 2017.
U.S. Appl. No. 16/275,100, filed Feb. 13, 2019.
Extended European Search Report for EP Patent Application No. 19212501.1 dated Mar. 11, 2020.
European Communication for EP Patent Application No. 19217738.4 dated Aug. 25, 2022.
Extended European Search Report for EP Patent Application No. 19217738.4 dated Jun. 18, 2020.

* cited by examiner

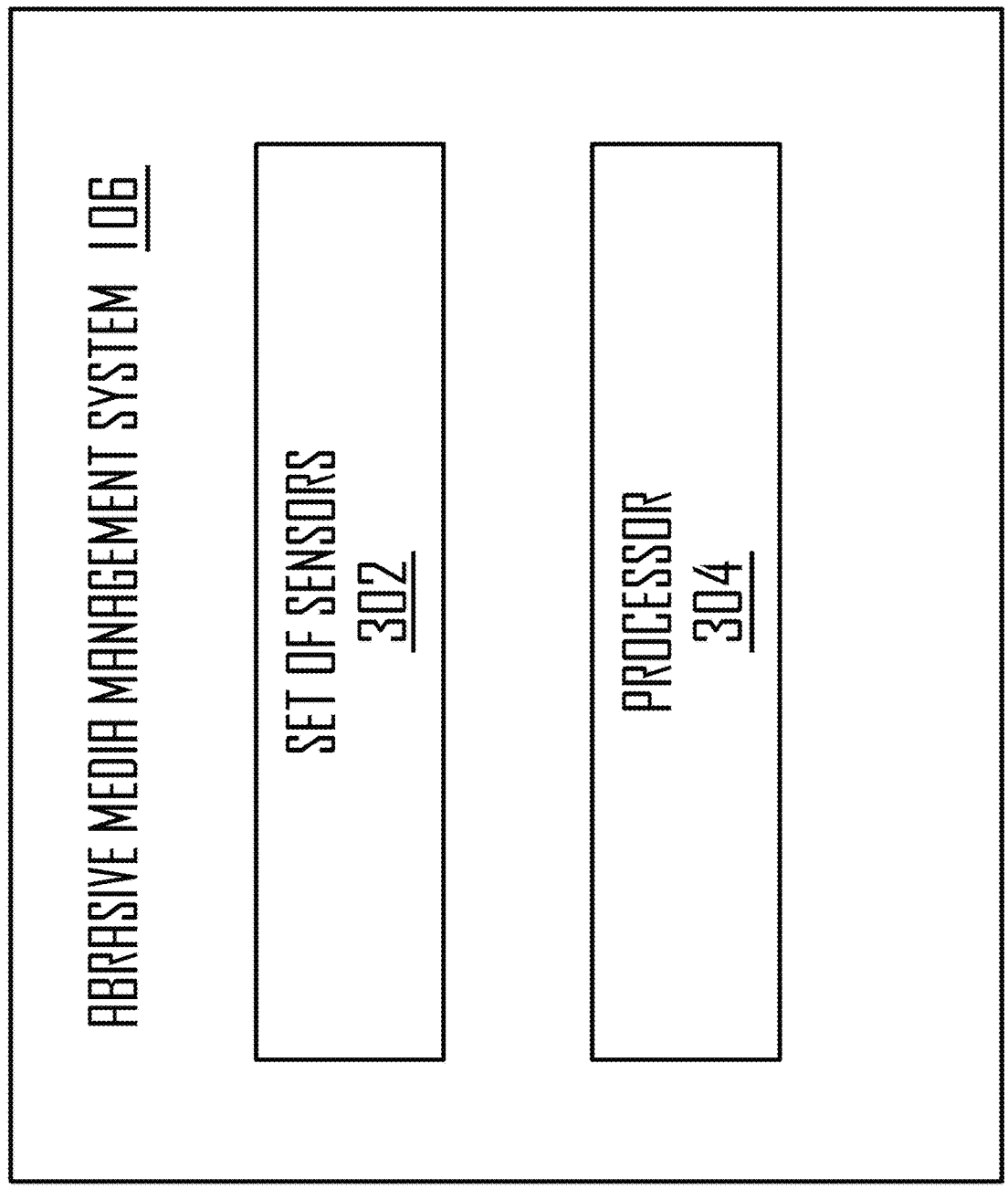

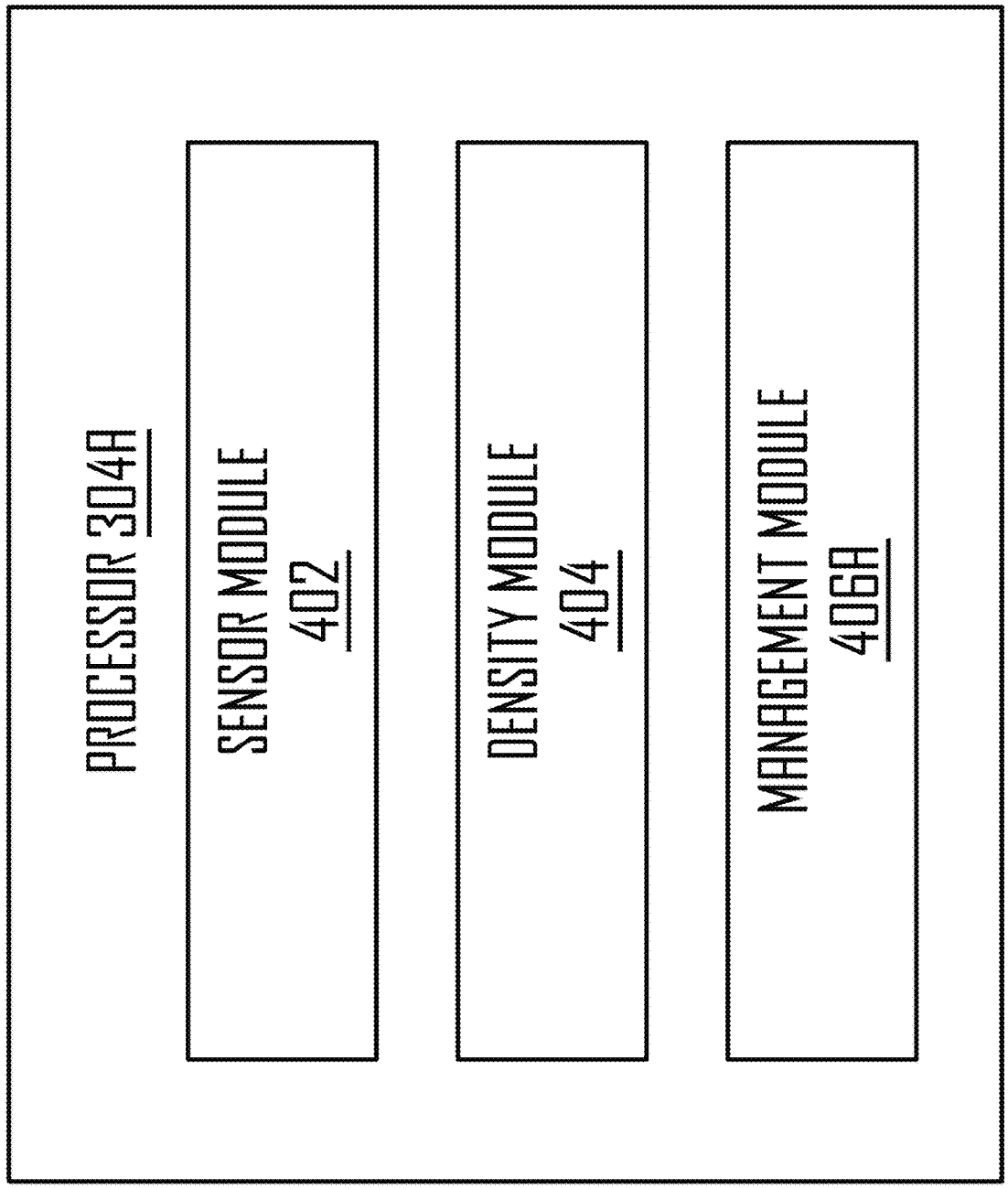

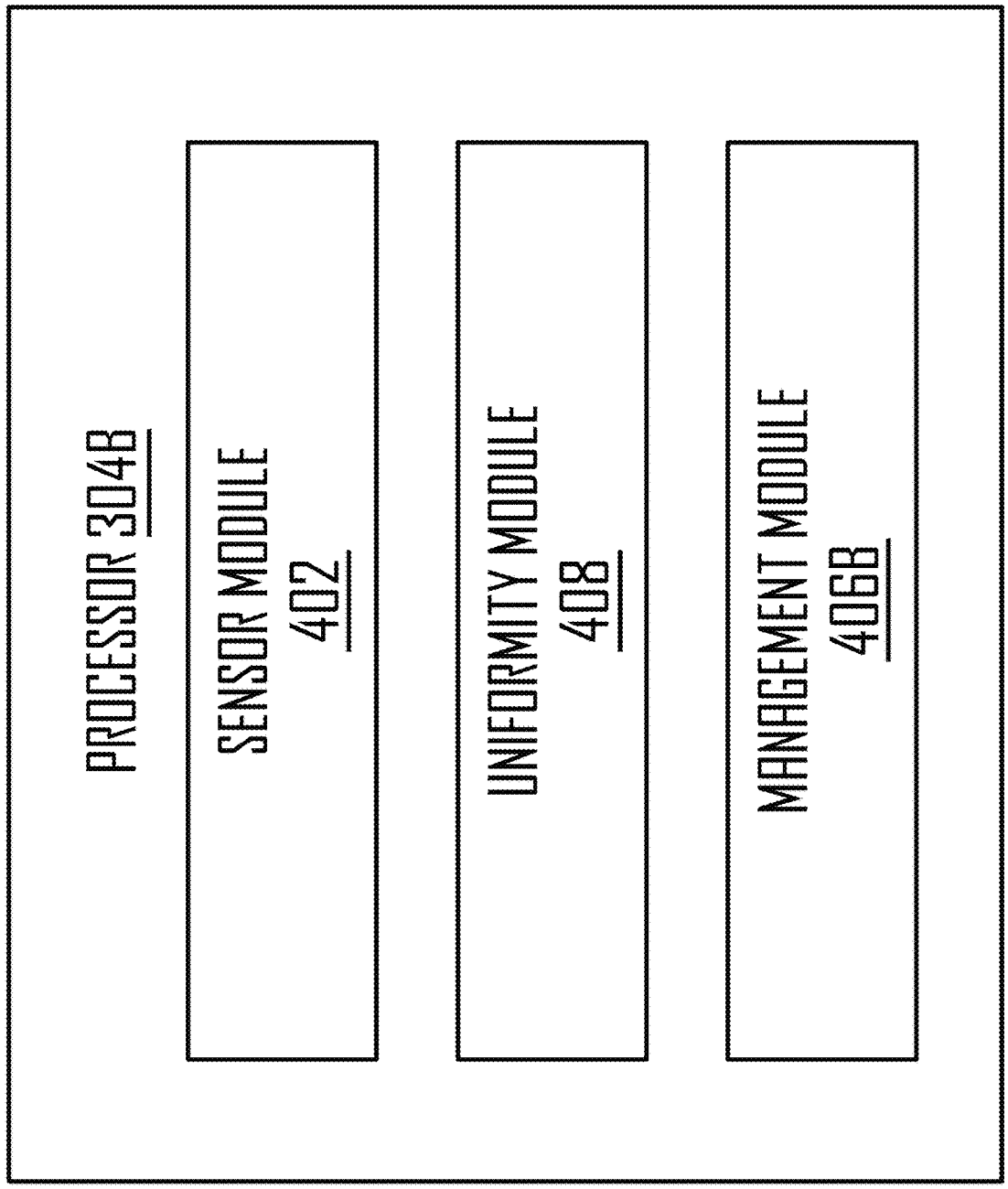

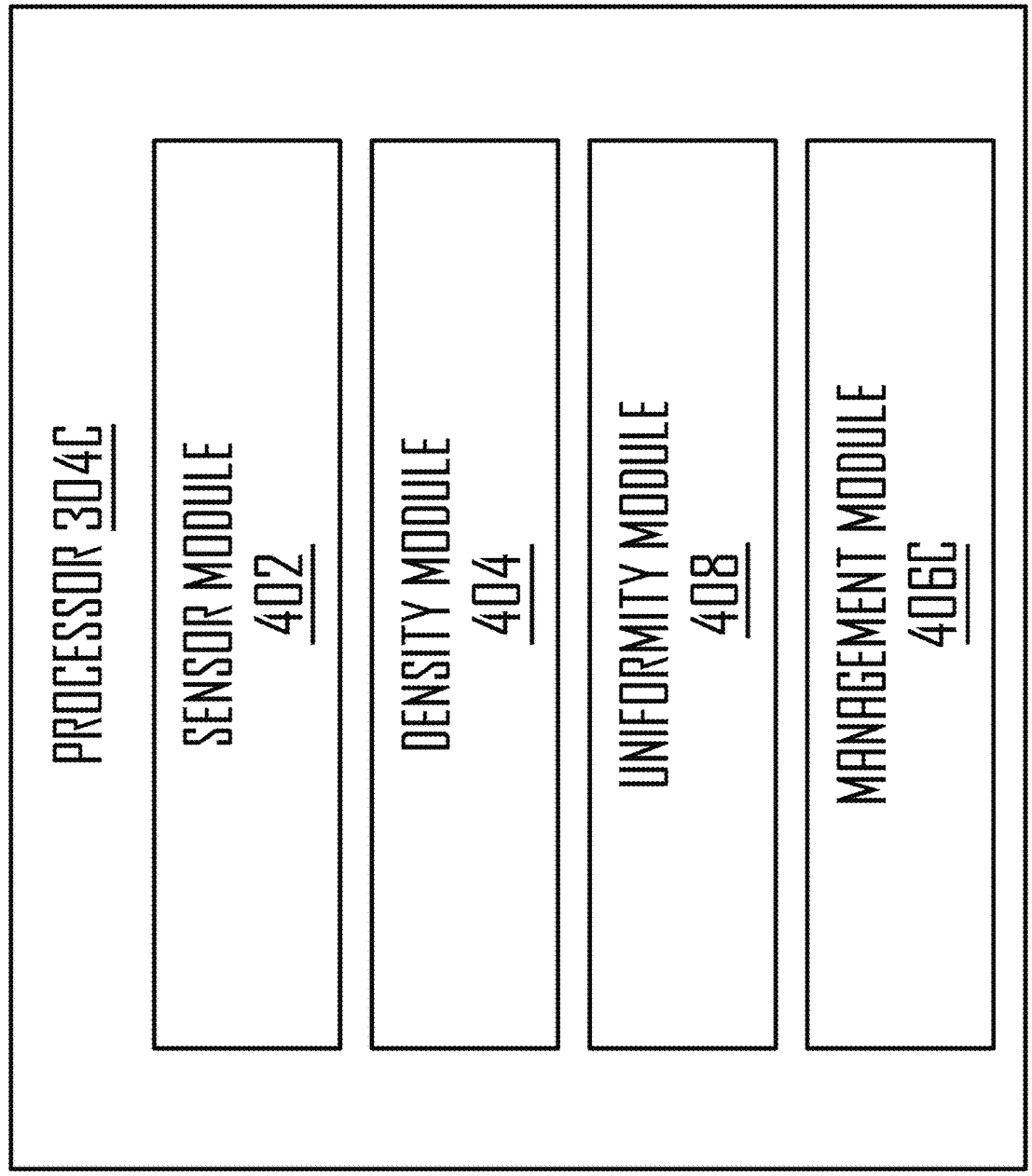

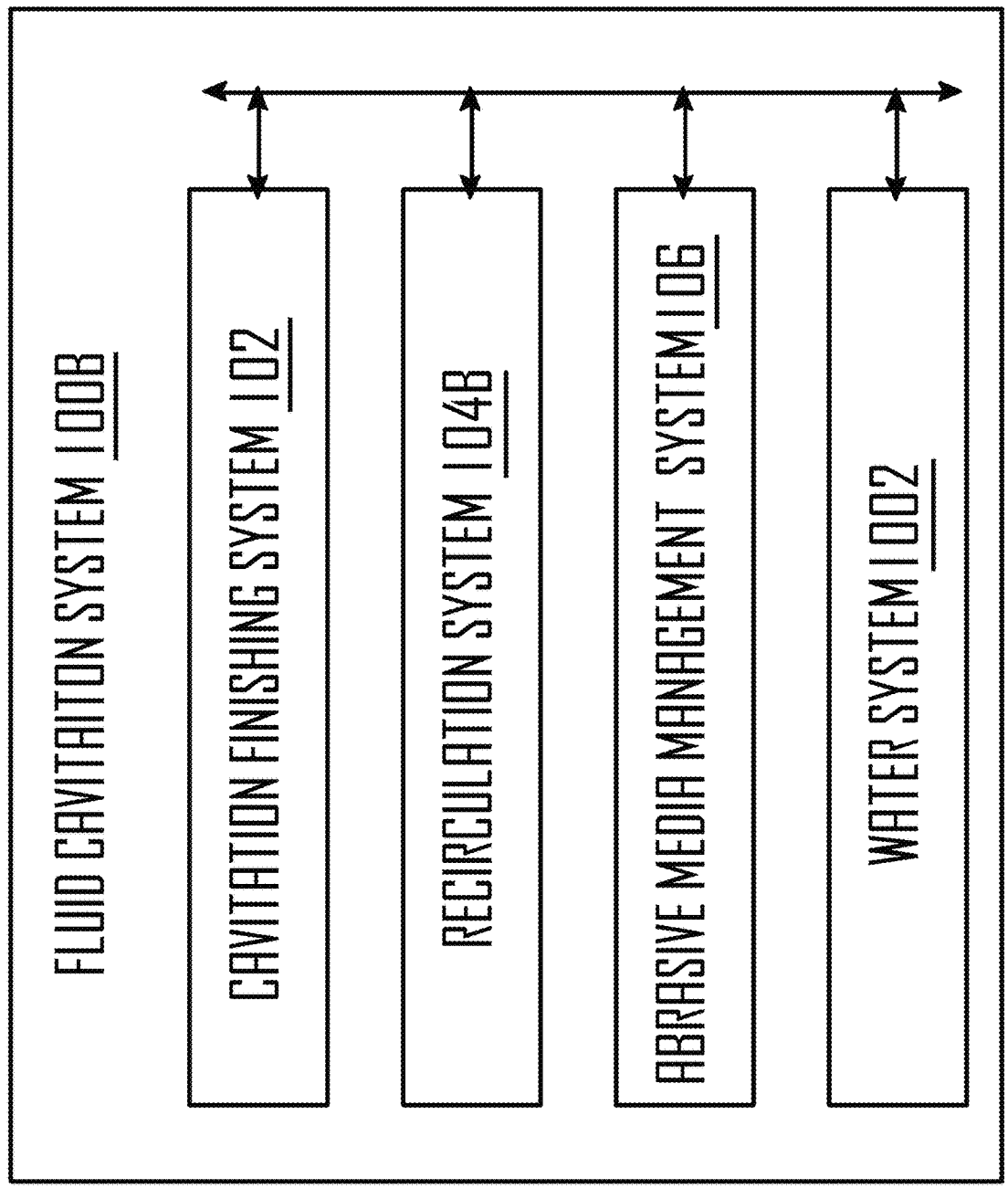

SYSTEMS FOR MANAGING ABRASIVE MEDIA IN CAVITATED FLUID

FIELD

This disclosure relates generally to cavitation surface finishing, and more particularly to managing abrasive media in cavitated fluid.

BACKGROUND

Additive manufacturing has created an entirely new design space for aircraft parts that can have complex shapes and features. However, one of the drawbacks with some additive manufacturing process methods is that the resulting surface finish of the manufactured parts is much rougher than aircraft components produced using traditional and/or conventional manufacturing methods. Processes, such as electron beam powder bed melting and laser beam powder bed melting, typically create a surface roughness average that can be over 1,000 micrometers, which is more than ten times greater than the surface roughness average used for finished aircraft parts.

Fluid cavitation is a process that is capable of finishing all of the surfaces of almost any shape created by additive manufacturing to levels that are less than or equal to the surface roughness average for finished aircraft parts. In a fluid cavitation process, the density of the abrasive media in the water processing tank is an important process control parameter. Conventional fluid cavitation processes do not include an efficient way of managing abrasive media levels in a cavitated fluid.

SUMMARY

The subject matter of the present application has been developed in response to the present state of the art, and in particular, in response to the shortcomings of managing abrasive media levels in a cavitated fluid in conventional fluid cavitation processes, that have not yet been fully solved by currently available techniques. Accordingly, the subject matter of the present application has been developed to provide an apparatus, system, and associated method that overcome at least some of the above-discussed shortcomings of the prior art techniques.

Disclosed herein are systems for managing abrasive media in a cavitated fluid within a processing tank for use in performing a cavitation peening technique on a workpiece in the processing tank. One system includes a set of sensors in communication with the cavitated fluid in the processing tank and a processor coupled to the set of sensors. The processor is configured to determine a density of an abrasive media in the cavitated fluid in the processing tank in response to input from the set of sensors and facilitate maintaining the density of abrasive media in the cavitated fluid in the processing tank at a level that is greater than or equal to a threshold level of abrasive media. The preceding subject matter of this paragraph characterizes example 1 of the present disclosure.

The processor, to facilitate maintaining the density of abrasive media in the cavitated fluid in the processing tank is configured to facilitate adding abrasive media to the cavitated fluid in response to detecting that a current level of abrasive media in the cavitated fluid is less than the threshold level of abrasive media and maintain the current level of abrasive media in the cavitated fluid in response to detecting that the current level of abrasive media in the cavitated fluid is greater than or equal to the threshold level of abrasive media. The preceding subject matter of this paragraph characterizes example 2 of the present disclosure, wherein example 2 also includes the subject matter according to example 1, above.

The system further includes an abrasive media addition device in communication with the processor and in fluid communication with the processing tank in which the abrasive media addition device is configured to add recycled abrasive media to the cavitated fluid in the processing tank. The preceding subject matter of this paragraph characterizes example 3 of the present disclosure, wherein example 3 also includes the subject matter according to example 1, above.

The system further includes an abrasive media distribution device within the processing tank in which the abrasive media distribution device is configured to spread settled abrasive media in the processing tank to the cavitated fluid to increase a uniformity of abrasive media throughout the processing tank. The preceding subject matter of this paragraph characterizes example 4 of the present disclosure, wherein example 4 also includes the subject matter according to examples 1 and 3, above.

In determining the density of abrasive media, the processor is configured to calculate an average density of abrasive media in the cavitated fluid and the processor is further configured to command the abrasive media addition device to add the recycled abrasive media to the processing tank to increase the density of abrasive media in the cavitated fluid in response to determining that the average density of abrasive media is less than the threshold density of abrasive media. The preceding subject matter of this paragraph characterizes example 5 of the present disclosure, wherein example 5 also includes the subject matter according to examples 1 and 3, above.

The system further includes an abrasive media distribution device within the processing tank in which the abrasive media distribution device configured to spread settled abrasive media in the processing tank to the cavitated fluid to increase a uniformity of abrasive media throughout the processing tank. The preceding subject matter of this paragraph characterizes example 6 of the present disclosure, wherein example 6 also includes the subject matter according to example 1, above.

The system further includes a recirculation system coupled to the processing tank in which the recirculating system configured to receive overflow cavitation fluid from the processing tank and supply abrasive media in the overflow cavitation fluid back to the processing tank for re-use in the cavitated fluid. The preceding subject matter of this paragraph characterizes example 7 of the present disclosure, wherein example 7 also includes the subject matter according to example 1, above.

The system further includes an input device configured to remove material from a surface of the workpiece in which the input device is coupled to the recirculation system and the recirculation system is configured to supply water to the input device. The preceding subject matter of this paragraph characterizes example 8 of the present disclosure, wherein example 8 also includes the subject matter according to examples 1 and 7, above.

The system further includes an input device configured to remove material from a surface of the workpiece and a water source coupled to the input device. The preceding subject matter of this paragraph characterizes example 9 of the present disclosure, wherein example 9 also includes the subject matter according to examples 1 and 7, above.

The set of sensors is further configured to facilitate maintaining a uniform density of abrasive media in the cavitated fluid throughout the processing tank. The preceding subject matter of this paragraph characterizes example 10 of the present disclosure, wherein example 10 also includes the subject matter according to example 1, above.

The set of sensors includes a plurality of sensors in which each sensor is in communication with the cavitated fluid at a different location in the processing tank and each sensor is configured to determine a density of abrasive media in the cavitated fluid at a respective location in the processing tank. The preceding subject matter of this paragraph characterizes example 11 of the present disclosure, wherein example 11 also includes the subject matter according to example 1, above.

The system further includes an abrasive media distribution device within the processing tank in which the abrasive media distribution device is in communication with the processor, the processor is configured to determine a location in the processing tank that includes a density of abrasive media that is less than another location in the processing tank, and the abrasive media distribution device is configured to spread the abrasive media at the location to increase a density of abrasive media in the cavitated fluid at the location. The preceding subject matter of this paragraph characterizes example 12 of the present disclosure, wherein example 12 also includes the subject matter according to examples 1 and 11, above.

Further disclosed herein are methods for managing abrasive media in cavitated fluid in a processing tank for use in performing a cavitation peening technique on an object in the processing tank. One method includes determining, via a processor, a density of abrasive media in the cavitated fluid in the processing tank) and maintaining the density of abrasive media in the cavitated fluid in the processing tank at a level that is greater than or equal to a threshold density of abrasive media. The preceding subject matter of this paragraph characterizes example 13 of the present disclosure.

In some methods, maintaining the density of abrasive media in the cavitated fluid in the processing tank includes adding abrasive media to the cavitated fluid from a recirculation system in response to determining that a current level of abrasive media in the cavitated fluid is less than the threshold density of abrasive media. The preceding subject matter of this paragraph characterizes example 14 of the present disclosure, wherein example 14 also includes the subject matter according to example 13, above.

The method further includes spreading settled abrasive media in the processing tank to maintain a uniform density of abrasive media in the cavitated fluid throughout the processing tank. The preceding subject matter of this paragraph characterizes example 15 of the present disclosure, wherein example 15 also includes the subject matter according to examples 13 and 14, above.

The method further includes spreading settled abrasive media in the processing tank to maintain a uniform density of abrasive media in the cavitated fluid throughout the processing tank. The preceding subject matter of this paragraph characterizes example 16 of the present disclosure, wherein example 16 also includes the subject matter according to example 13, above.

The method further includes determining a location in the processing tank that includes a respective density of abrasive media that is less than another location in the processing tank, wherein spreading the settled abrasive media comprises spreading the settled abrasive media to the location in response to the determination. The preceding subject matter of this paragraph characterizes example 17 of the present disclosure, wherein example 17 also includes the subject matter according to examples 13 and 16, above.

In some methods, determining the density of abrasive media comprises calculating an average of density of abrasive media based on a plurality of densities of abrasive media detected at different locations in the processing tank. The preceding subject matter of this paragraph characterizes example 18 of the present disclosure, wherein example 18 also includes the subject matter according to example 13, above.

The method further includes determining a location in the processing tank that includes a respective density of abrasive media that is less than another location in the processing tank and, in response to the determination, spreading settled abrasive media in the processing tank to the location to maintain a uniform density of abrasive media in the cavitated fluid throughout the processing tank. The preceding subject matter of this paragraph characterizes example 19 of the present disclosure, wherein example 19 also includes the subject matter according to examples 13 and 18, above.

Also disclosed herein are apparatus for managing abrasive media in cavitated fluid in a processing tank for use in performing a cavitation peening technique on a workpiece in the processing tank. One apparatus includes a sensor module configured to detect a density of an abrasive media in the cavitated fluid in the processing tank, a density module configured to add recycled abrasive media to the cavitated fluid in response to detecting that a current density of abrasive media in the cavitated fluid is less than a threshold density of abrasive media, and a uniformity module configured to spread settled abrasive media to a location in the processing tank to increase a uniformity of density of abrasive media in the processing tank in response to determining that the location includes a respective density of abrasive that is less than another area of the processing tank. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 3 is a block diagram of an abrasive media management system as illustrated in FIG. 1, according to one or more examples of the present disclosure;

FIGS. 4A through 4C are block diagrams of various processors included in the abrasive media management system of FIG. 3, according to one or more examples of the present disclosure;

FIG. 10 is a block diagram of a cavitation system, according to one or more further examples of the present disclosure;

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Referring to FIGS. 1 through 9, one embodiment of a fluid cavitation system 100A that can manage abrasive media in cavitated fluid is illustrated. At least in the illustrated embodiment of FIG. 1, the fluid cavitation system 100A includes, among other components, a cavitation finishing system 102, a recirculation system 104A, and an abrasive media management system 106 coupled to and/or in communication with one another.

Figure 1:
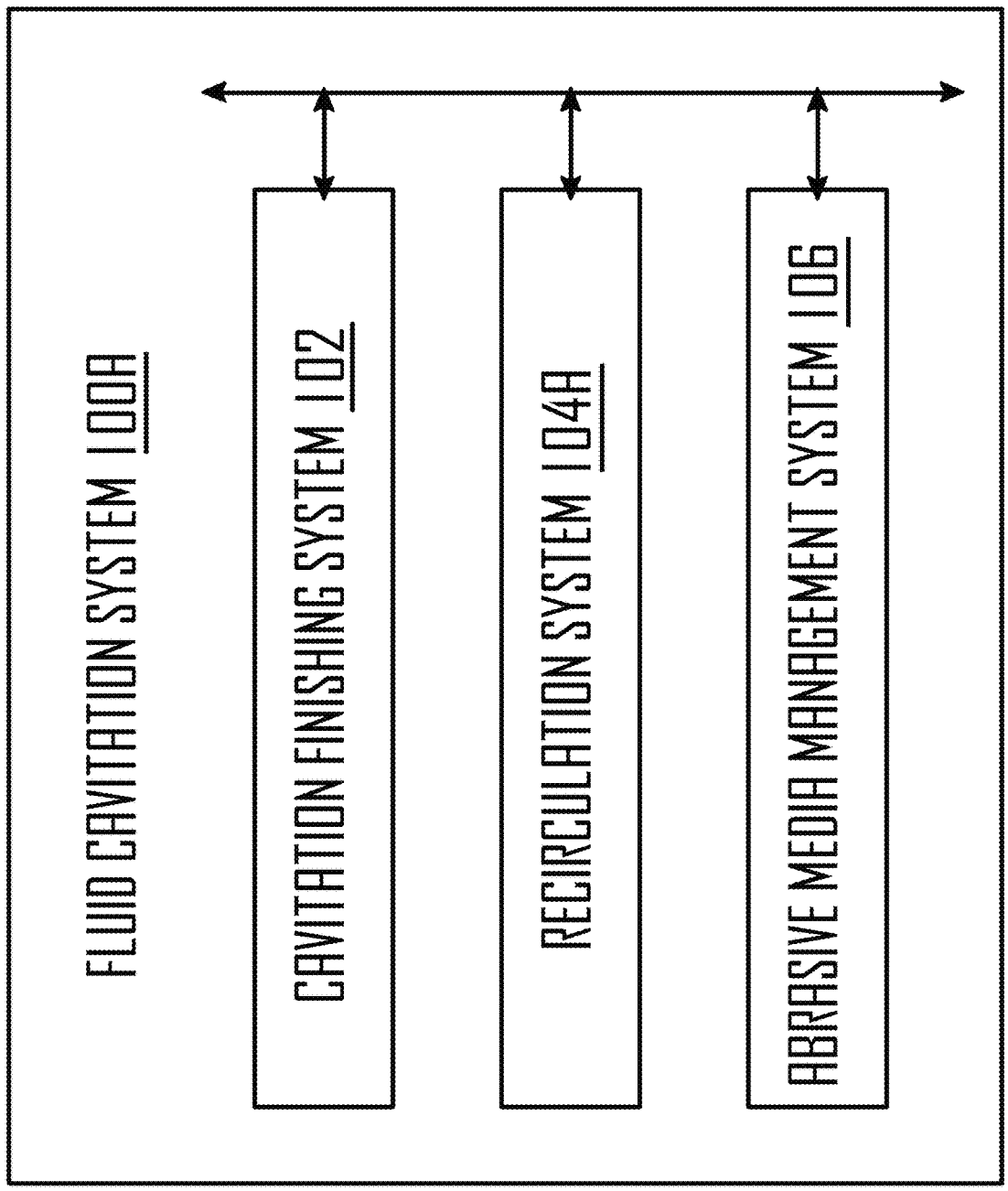
FIG. 1 is a block diagram of a cavitation system, according to one or more examples of the present disclosure.
Figure 2:
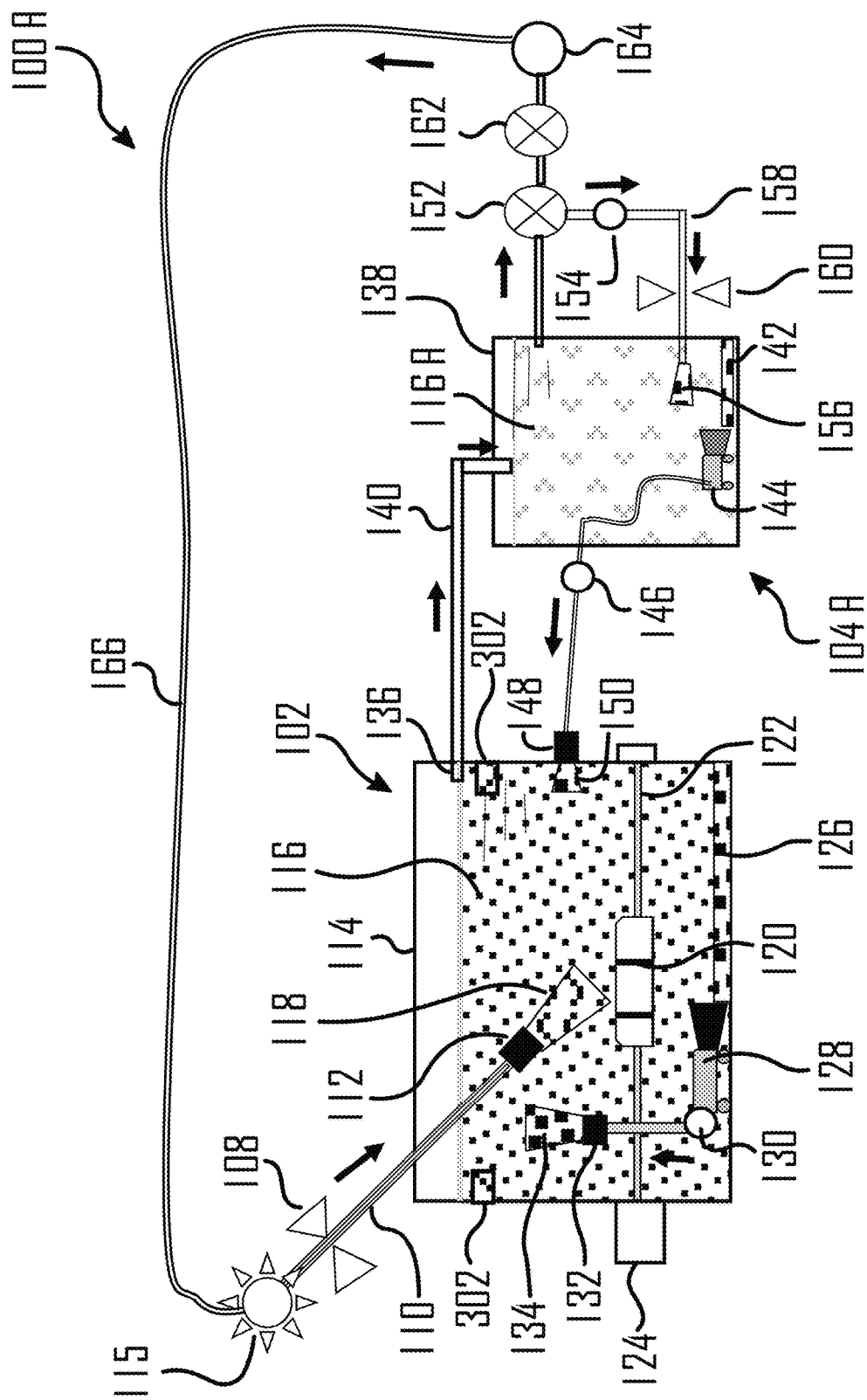
FIG. 2 is a diagram of one embodiment of the cavitation system of FIG. 1.
Figure 5:
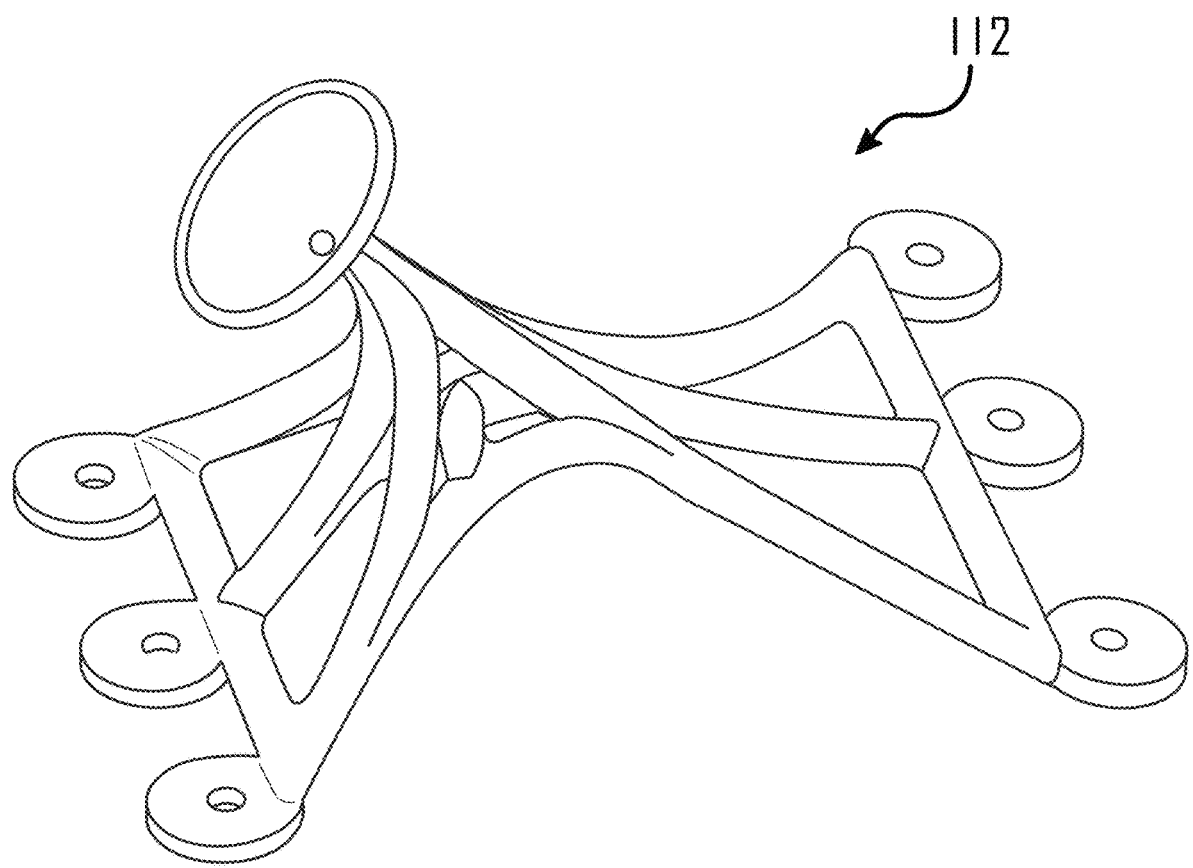
FIG. 5 is a diagram of an as-built additive manufactured workpiece needing surface smoothing, according to one or more examples of the present disclosure.

As shown in FIG. 2, the cavitation finishing system 102 includes, among other components, a pressure valve 108 (or high-pressure pump) that supplies pressurized recirculated fluid (e.g., overflow fluid) along a conduit 110. The pressure valve 108, in some embodiments, includes an electronically controlled digital pressure valve. In additional or alternative embodiments, the pressure valve 108 includes a pressure sensor to detect the pressure of the water in the pressure valve 108. The pressure valve 108 allows control of the pressure and flow rate of the water supplied along the conduit 110 to an input device 112 in a processing tank 114.

The input device 112 is disposed in the processing tank 114 and may include any suitable device that can inject the water into a cavitated fluid 116 in the processing tank 114 to generate a cavitation cloud 118. In some embodiments, the input device 112 includes a cavitation nozzle (see, e.g., FIGS. 6 and 8) configured to inject the pressurized water into the cavitated fluid 116 as a cavitated jet.

A multi-axis robot 115 (e.g., a CNC motion controller) is coupled to the input device 112. The multi-axis robot 115, or simply robot, is configured to move the input device 112 around within the processing tank 114. The multi-axis robot 115 can allow the input device 112 to access various locations within the processing tank 114.

The processing tank 114 may be formed of any suitable material. In some embodiments, the processing tank 114 is formed of stainless steel and/or any other non-corrosive material. The processing tank 114, in various embodiments, is pressurized or not pressurized.

The processing tank 114 is filled with the cavitated fluid 116. The cavitated fluid 116 includes a mixture of water (e.g., clean and/or pure water) and an abrasive media (or abrasive material). The cavitated fluid 116 may include any suitable ratio of water to abrasive media that can remove material from the surface of a workpiece 120 to smooth out the surface during a fluid cavitation technique. The ratio of water to abrasive media in the cavitated fluid 116 can be referenced herein as the level of abrasive media or the density of abrasive media in the cavitated fluid 116.

In various embodiments, the density of abrasive media in the cavitated fluid 116 is in the range of about 10 grams per liter (g/L) to about 1,000 g/L, among other ratios and/or ranges of ratios that are possible and contemplated herein. In some embodiments, the density of abrasive media in the cavitated fluid 116 is about 22.5 g/L, among other ratios greater than or less than 22.5 g/L that are possible and contemplated herein. In further embodiments, the density of abrasive media in the cavitated fluid 116 is about 400 g/L, among other ratios greater than or less than 400 g/L that are possible and contemplated herein.

The abrasive media may include any suitable material that, in combination with water, can form a slurry of cavitated fluid 116 that can remove material from a surface of the workpiece 120 to smooth out the surface during a fluid cavitation technique. In some embodiments, the abrasive media includes aluminum oxide ($Al_2O_3$), among other suitable materials that are possible and contemplated herein.

The abrasive media may include any suitable ANSI grit size than can smooth out the surface of a workpiece 120 during a fluid cavitation technique. In various embodiments, the abrasive media includes an ANSI grit size in the range of about 16 ANSI grit size to about 1200 ANSI grit size, among other ANSI grit sizes that are possible and contemplated herein. In some embodiments, the abrasive media includes an 80 ANSI grit size. In other embodiments, the abrasive media includes a 220 ANSI grit size.

The cavitating jet of water from the input device 112 is directed toward the workpiece 120 submerged in the cavitated fluid 116. The interaction between the cavitating jet of high pressure water and the cavitated fluid 116 generates a swirling cavitation cloud 118 that includes a plurality of cavitation bubbles. A cavitation cloud 118 may include any suitable size. In some embodiments, the cavitation cloud 118 includes a size that enables the cavitation cloud 118 to smooth out one or more surfaces of the workpiece 120.

The workpiece 120 may be positioned on a shaft 122 in the processing tank 114 that is rotatable by a motor 124. Rotating the workpiece 120 via the shaft 122 and motor 124 allows the cavitation cloud 116 to surround the entirety of or at least a portion of the workpiece 120.

The shock wave created by collapsing water cavitation vapor bubbles 118 imploding as they return back to a fluid state kinetically charges the abrasive particles contained in the cavitation fluid 116, such that the cavitation cloud 118 impact the various surfaces of the workpiece 120. That is, collapsing cavitation bubbles in the cavitation cloud 118 impact the various surfaces of the workpiece 120 as the workpiece 120 is rotated by the motor 124 to smooth the surface(s) of the workpiece 120. Smoothing the surface(s) of the workpiece 120 via the cavitation cloud 116 can make the workpiece 120 smooth enough for use in an aircraft. Since the cavitation cloud 118 and bubbles impart a swirling and multi-directional motion to the abrasive media, material may be removed from corners, crevices, and/or internal features of the workpiece 120. The cavitation bubbles may further perform cavitation peening and cleaning of the surface of the workpiece 120.

The collapsing impact force of a cavitation bubble is influenced, at least in part, by the pressure of the water in the cavitating jet, the pressure of the cavitated fluid 116 in the processing tank 114, the ratio between the water pressure and the pressure of the cavitated fluid 116, the temperature of the water in the cavitating jet, and the temperature of the cavitated fluid 116 in the processing tank 114. The pressure of the water in the cavitating jet may be in the range of about 3,000 pounds per square inch (PSI) (20 megaPascals (MPa)) to about 15,000 PSI (100 MPa), among other pressures that are possible and contemplated herein. In some embodiments, the pressure of the water in the cavitating jet is about 4,000 PSI and the pressure of the cavitated fluid 116 in the processing tank 102 is at one atmosphere (101.325 kPa or 14.7 PSI) or at a higher pressure.

At times, the abrasive media in the cavitation fluid 116 can settle forming a layer 126 of abrasive media on the bottom of the processing tank 114. A pump 128 (e.g., a sweeper pump) or a plurality of pumps 128 is/are utilized to capture the abrasive media from the bottom of the processing tank 114 and a pump 130 (e.g., a trash pump) pumps the captured abrasive media to an abrasive media distribution device 132. In some embodiments, the abrasive media distribution device 132 includes a fanning nozzle, among other suitable devices that are possible and contemplated herein.

The abrasive media distribution device 132 redistributes, re-introduces, and/or spreads the captured abrasive media captured from the layer 126 to the cavitated fluid 116. In various embodiments, the abrasive media distribution device 132 is mobile so that the captured abrasive media can be spread throughout the processing tank 114.

In some embodiments, the abrasive media distribution device 132 can receive a command to spread the captured abrasive media to one or more locations in the processing tank 114. In response to receiving the command, the abrasive media distribution device 132 moves to the location(s) identified in the command and spreads the captured abrasive media at the location(s). The abrasive media distribution device 132 can spread the captured abrasive media in a fan 134 of captured abrasive media combined with cavitated fluid 116. The abrasive media distribution device 132 can continue spreading the captured abrasive media until the abrasive media distribution device 132 receives a subsequent command to stop spreading the captured abrasive media at the location(s) or a command to spread the captured abrasive media at one or more different locations in the processing tank 114.

Referring now to the recirculation system 104A, the recirculation system 104A is configured to recirculate, redistribute, and/or recycle abrasive media to the cavitation finishing system 102. The recirculation system 104A provides, at least in part, a mechanism and/or process for managing the abrasive media levels in the processing tank 114. In this manner, the fluid cavitation system 100A defines a closed loop system.

The recirculation system 104A includes an overflow output 136 in fluid communication with the processing tank 114. The overflow output 136 may be any suitable overflow (e.g., a drain, aperture, funnel, etc.) that can provide excess cavitation fluid 116 from the processing tank 114 to a recirculation tank 138 via a conduit 140, which is stored as overflow cavitation fluid 116A.

At times, the abrasive media in the overflow cavitation fluid 116A can settle forming a layer 142 of abrasive media on the bottom of the recirculation tank 138. A pump 144 (e.g., a sweeper pump) is utilized to capture the abrasive media from the bottom of the recirculation tank 138 and a pump 146 (e.g., a low pressure trash pump) pumps the captured abrasive media to an abrasive media addition device 148.

In some embodiments, the abrasive media addition device 148 includes a fanning nozzle, among other suitable devices that are possible and contemplated herein. The abrasive media addition device 148 is configured to add abrasive media to the processing tank 114. The abrasive media addition device 148 adds the captured abrasive media to the processing tank 114 in a fan 150 of captured abrasive media combined with overflow cavitated fluid 116A.

In some embodiments, the abrasive media addition device 148 can receive a command to add the captured abrasive media to the processing tank 114. In response to receiving the command, the abrasive media addition device 148 adds the abrasive media captured from the recirculation tank 138 to the processing tank 114. The abrasive media addition device 148 can continue adding the captured abrasive media until the abrasive media addition device 148 receives a subsequent command to stop adding the captured abrasive media to the processing tank 114.

A filter 152 (e.g., a centrifugal water filter) filters and/or recovers abrasive media in the overflow cavitated fluid 116A. A pump 154 (e.g., a low pressure trash pump) re-introduces the filtered abrasive media 156 to the recirculation tank 138 via a return line 158 and a pressure/control valve 160.

A filter 162 (e.g., a cartridge filter) further filters the overflow cavitation fluid 116A that has been filtered by the filter 152 to filter/recover the abrasive media to remove other impurities (e.g., material removed from the workpiece 120)

therein, which results in filtered water (e.g., clean and/or pure water). A pump 164 (e.g., a pressure pump) supplies the filtered water to the multi-axis robot 115 in the cavitation finishing system 102 via a conduit 166.

As discussed herein, the density of abrasive media in the cavitation fluid 116 and the uniformity of the density of abrasive media throughout the cavitation fluid 116 are parameters influencing the ability of the cavitation cloud 118 to smooth out the surface of the workpiece 120. To manage the density of abrasive media in the cavitation fluid 116 and/or the uniformity of the density of abrasive media throughout the cavitation fluid 116, an abrasive media management system 106 including a set of sensors 302 (also simply referred individually, in various groups, or collectively as sensor(s) 302) is in communication (e.g., is in contact with, proximate to, etc.) with the cavitation fluid 116 in the processing tank 114.

Referring to FIG. 3, FIG. 3 is a block diagram of one embodiment of an abrasive media management system 106. At least in the illustrated embodiment, the abrasive media management system 106 includes, among other components, a set of sensors 302 and a processor 304 coupled to and/or in communication with one another.

Each sensor 302 may include any suitable hardware or combination of hardware and software that can detect the amount, level, and/or density of abrasive media in the cavitated fluid 116. In some embodiments, each sensor 302 includes a laser capable of detecting/determining the density of abrasive media in the cavitated fluid 116.

The laser may utilize any suitable wavelength and/or include any suitable output power that can detect/determine the density of abrasive media in the cavitation fluid 116. In some embodiments, the laser uses a wavelength of about 975 nanometers (nm), among other wavelengths greater than or less than 975 nm that are possible and contemplated herein. In additional or alternative embodiments, the laser includes an output power of about 0.45 watts (W), among other output powers greater than or less than 0.45 W that are possible and contemplated herein.

The set of sensors 302 may include any suitable quantity of sensors 302 that can detect/determine the density of abrasive media in the cavitated fluid 116. In some embodiments, the set of sensors 302 includes a plurality of sensors 302 distributed throughout the processing tank 114.

In various embodiments, each sensor 302 in the plurality of sensors 302 is positioned at a different location in the processing tank 114 to detect/determine the density of abrasive media at each respective location in the processing tank 114. Being distributed throughout the processing tank 114, the sensors 302 in the plurality of sensors 302 can detect/determine the uniformity of the density of abrasive media in the cavitated fluid 116 throughout the processing tank 114.

Each sensor 302 can continuously, substantially continuously, and/or periodically detect/determine the density of abrasive media in the cavitated fluid 116. In response to detecting the density of abrasive media in the cavitated fluid 116, each sensor 302 communicates the detected density of abrasive media to the processor 304. That is, each sensor 302 transmits one or more signals including sensor data identifying the detected density of abrasive media to the processor 304.

A processor 304 may include any suitable processing hardware and/or software capable of performing computer processes, functions, and/or algorithms. In various embodiments, the processor 304 is configured to manage abrasive media levels in the cavitated fluid 116.

With reference to FIG. 4A, FIG. 4A is a block diagram of one embodiment of a processor 304A. At least in the illustrated embodiment, the processor 304A includes, among other components, a sensor module 402, a density module 404, and a management module 406A coupled to and/or in communication with one another.

A sensor module 402 may include any suitable hardware and/or software than can communicate with each sensor 302 in the set of sensors 302. In some embodiments, the sensor module 402 is configured to receive sensor data that indicates the density of abrasive media in the cavitated fluid 116 detected by one or more sensors 302 in the set of sensors 302. In response to receiving the sensor data, the sensor module 402 is configured to transmit the sensor data to the density module 404 and/or to a uniformity module 406 (see e.g., FIGS. 4B and 4C).

A density module 404 may include any suitable hardware and/or software than can determine the current density of abrasive media in the cavitated fluid 116. In various embodiments, the density module 404 is configured to receive sensor data from the sensor module 402, determine the current density of abrasive media in the cavitated fluid, and transmit the current density of abrasive media in the cavitated fluid to the management module 406A.

In some embodiments, the density module 404 is configured to determine the current density of abrasive media in the cavitated fluid 116 based on the sensor data generated by a single sensor 302. In further, embodiments, the density module 404 is configured to determine the current density of abrasive media in the cavitated fluid 116 based on the sensor data generated by a plurality of sensors 302.

In various embodiments, the density module 404 is configured to calculate the current density of abrasive media in the cavitated fluid 116 based on the sensor data generated by a plurality of sensors 302. The current density of abrasive media in the cavitated fluid 116, in some embodiments, is the average of the densities of abrasive media detected by a plurality of sensors 302. In other embodiments, the current density of abrasive media in the cavitated fluid 116 is the median ratio of the densities of abrasive media detected by a plurality of sensors 302. In further embodiments, the current density of abrasive media in the cavitated fluid 116 is the mode of the densities of abrasive media detected by a plurality of sensors 302.

The density module 404 is further configured to transmit the current density of abrasive media in the cavitated fluid 116 to the management module 406A after determining the current density of abrasive media. The density module 404 can continuously, substantially continuously, and/or periodically transmit the current density of abrasive media in the cavitated fluid 116 to the management module 406A.

A management module 406A may include any suitable hardware and/or software than can manage the density of abrasive media in the cavitated fluid 116. In various embodiments, the management module 406A is configured to maintain a threshold density of abrasive media in the cavitated fluid 116.

The management module 406A is configured to determine whether the current density of abrasive media in the cavitated fluid is greater than or equal to the threshold density of abrasive media upon receipt of the density of abrasive media from the density module 404. In some embodiments, the management module 406A is configured to transmit a command to the abrasive media addition device 148 to add abrasive media to the cavitated fluid 116 in the processing tank 114 in response to the management module 406A determining that the current density of abrasive media in the cavitated fluid in the processing tank 114 is less than the threshold density of abrasive media. The management module 406A can continue to command the abrasive media addition device 148 to add abrasive media to the cavitated fluid 116 in the processing tank 114 until a subsequent current density of abrasive media received from the density module 404 indicates that the cavitated fluid 116 in the processing tank 114 includes a current density of abrasive media that is greater than or equal to the threshold density of abrasive media. In this manner, the management module 406A can facilitate adding abrasive media to the cavitated fluid 116 in the processing tank 114.

Further, the management module 406A is configured to maintain the current density of abrasive media in the cavitated fluid 116 in response to determining that the current density of abrasive media in the cavitated fluid in the processing tank 114 is greater than or equal to the threshold density of abrasive media. In other words, the management module 406A is configured to not transmit a command to the abrasive media addition device 148 to add abrasive media to the cavitated fluid 116 in the processing tank 114 in response to the management module 406A determining that the current density of abrasive media in the cavitated fluid in the processing tank 114 is greater than or equal to the threshold density of abrasive media.

The management module 406A is configured to wait and/or prepare to receive the next current density of abrasive media in the cavitated fluid 116 from the density module 404 after determining that the current density of abrasive media in the cavitated fluid in the processing tank 114 is greater than or equal to the threshold density of abrasive media. In additional or alternative embodiments, the management module 406A is configured to wait and/or prepare to receive the next current density of abrasive media in the cavitated fluid 116 from the density module 404 after commanding the abrasive media addition device 148 to add abrasive media to the cavitated fluid 116 in the processing tank 114.

Referring to FIG. 4B, FIG. 4B is a block diagram of another embodiment of a processor 304B. At least in the illustrated embodiment, the processor 304B includes, among other components, a sensor module 402 similar to the processor 304A, a uniformity module 408, and a management module 406B coupled to and/or in communication with one another.

A uniformity module 408 may include any suitable hardware and/or software than can determine the uniformity of the density of abrasive media in the cavitated fluid 116. In various embodiments, the uniformity module 408 is configured to receive sensor data from the sensor module 402, determine whether one or more locations in the processing tank 114 include a density of abrasive media in the cavitated fluid 116 that is less than other locations in the processing tank 114, and transmit the location(s) in the processing tank 114 include a density of abrasive media in the cavitated fluid 116 that is/are less than other locations in the processing tank 114 to the management module 406B.

The uniformity module 408 can determine whether one or more locations in the processing tank 114 include a density of abrasive media in the cavitated fluid 116 that is less than other locations in the processing tank 114 using any suitable technique or process. In determining whether one or more locations in the processing tank 114 include a density of abrasive media in the cavitated fluid 116 that is less than other locations in the processing tank 114, the uniformity module 408, in some embodiments, is configured to compare the density of abrasive media detected by each sensor 302 and identify a location that includes a density of abrasive media that is less than the other locations. In additional or alternative embodiments, the uniformity module 404 is configured to determine the location(s) in the processing tank 114 that include the greatest density of abrasive media and identify the remaining location(s) in the processing tank 114 as including a density of abrasive media that is less than the other locations or the location(s) with the greatest density of abrasive media.

The uniformity module 408 is further configured to transmit the location(s) that include a density of abrasive media in the cavitated fluid 116 that is/are less than the other locations to the management module 406B. The uniformity module 408 can continuously, substantially continuously, and/or periodically transmit the location(s) to the management module 406A.

A management module 406B may include any suitable hardware and/or software than can manage the uniformity of density of abrasive media in the cavitated fluid 116. In some embodiments, the management module 406B is configured to transmit a command to the abrasive media distribution device 132 to spread abrasive media to the cavitated fluid 116 in the processing tank 114 to the location(s) in response to the management module 406B receiving the location(s) in the processing tank 114 that include a density of abrasive media that is less than other locations in the processing tank 114. The management module 406B can continue to command the abrasive media distribution device 132 to spread abrasive media within the cavitated fluid 116 in the processing tank 114 until subsequent densities of abrasive media received from the uniformity module 408 indicates that the cavitated fluid 116 in the processing tank 114 includes a uniform density of abrasive media and/or that there are no locations in the processing tank 114 that include a density of abrasive media that are less than the other locations in the processing tank 114.

In this manner, the management module 406B can facilitate spreading abrasive media within the cavitated fluid 116 and/or facilitate ensuring that the abrasive media is uniformly distributed within the processing tank 114. The management module 406B is configured to wait and/or to receive the next location(s) in the processing tank 114 to spread the abrasive media from the uniformity module 408.

With reference to FIG. 4C, FIG. 4C is a block diagram of yet another embodiment of a processor 304C. At least in the illustrated embodiment, the processor 304C includes, among other components, a sensor module 402 similar to the processors 304A and 304B, a density module 404 similar to the processor 304A, a uniformity module 408 similar to the processor 304B, and a management module 406C coupled to and/or in communication with one another.

The management module 406C may include any suitable hardware and/or software that can manage the density of abrasive media in the cavitated fluid 116 and manage the uniformity of density of abrasive media in the cavitated fluid 116 throughout the processing tank 114. In various embodiments, the management module 406C is configured to perform the various operations and/or processes of the management module 406A and the management module 406B discussed elsewhere herein.

Figure 6:
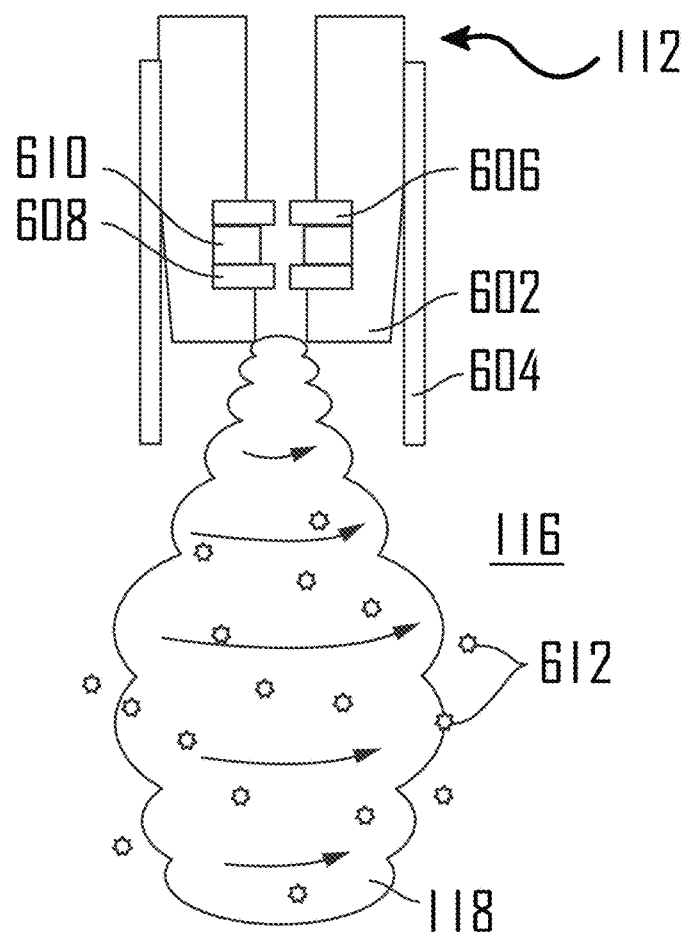
FIG. 6 is a diagram of an input device included in the cavitation system of FIG. 1, according to one or more further examples of the present disclosure.

FIG. 6 illustrates one embodiment of an input device 112. In the illustrated example, the input device 112 defines a cavitation nozzle. The input device 112 includes a nozzle cap 602 disposed in a guide pipe 604. A cavitator 606 is spaced from a nozzle plate 608 by spacer 610, and positioned in the nozzle cap 602 to alter flow of high pressure water through the cavitation nozzle. The change in flow rate of water and interaction with cavitated fluid 116 may result in the cavitation cloud 118. The plurality of cavitation bubbles comprising the cavitation cloud 118 may swirl in a vortex or tornado-like shape.

The abrasive media in the cavitated fluid 116 introduces a plurality of particles 612 of abrasive media into the cavitation cloud 118. The abrasive media may gain speed, momentum, and kinetic energy from the cavitation cloud 118 and mix with the cavitation bubbles.

Figure 7:
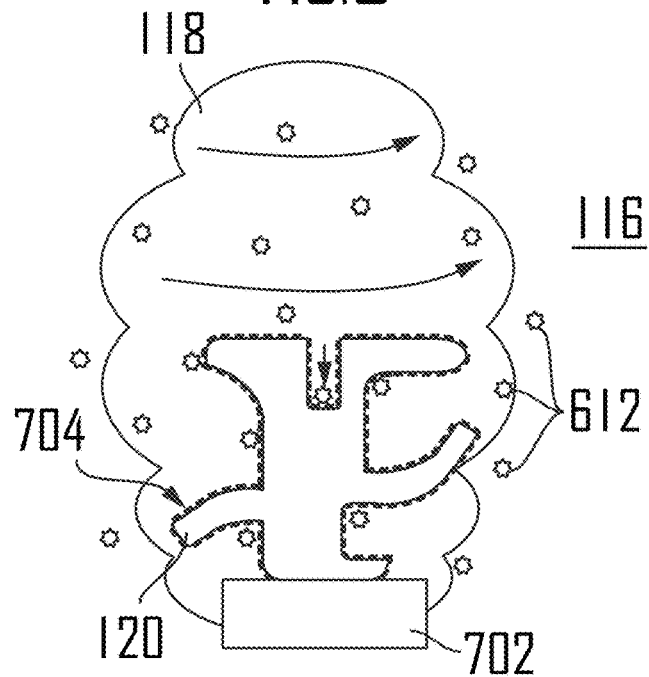
FIG. 7 is a diagram of a workpiece supported by a stage in a swirling mixture of cavitation bubbles and abrasive media generated by the input device of FIG. 6, according to one or more examples of the present disclosure.

FIG. 7 shows a workpiece 120 supported by a stage 702, in a swirling mixture of cavitation bubbles and abrasive media. The cavitation nozzle, not shown in FIG. 7, may be directed toward the stage 702. As the bubbles of the cavitation fluid 116 collapse, particles 612 of the abrasive media are excited and energized. The micro-jets created by collapsing bubbles collectively accelerate the motion of the particles 612. As the mixture of bubbles and abrasive media contacts a rough surface 704 of the workpiece 120, the particles 612 impact the surface 704 and remove material from the surface 704. That is, the abrasive media are acted on by the high forces of the cavitation cloud 118 to smooth the surface 704. The swirling and multi-directional motion of the cavitation cloud 118 brings the abrasive media into contact with tight corners, crevices, and/or internal features of the surface 704, as well as other exposed areas.

Normal cavitation peening may also occur as the cavitation bubbles interact directly with the surface 704 of the workpiece 120. The surface 704 may be thereby peened, which improves residual stress and fatigue strength, and cleans the surface 704 so that it is ready for painting or use in an aircraft.

Figure 8:
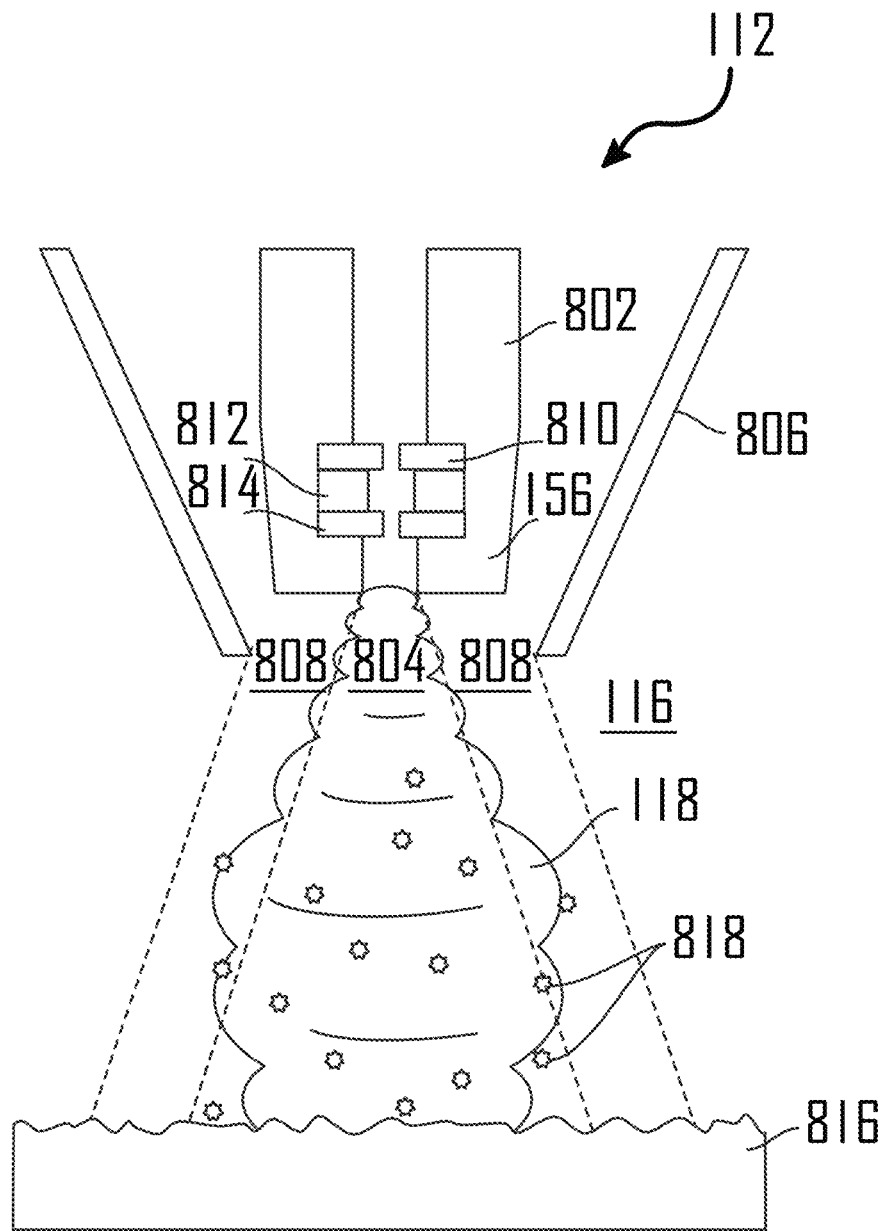
FIG. 8 is a diagram of an input device included in the cavitation system of FIG. 1, according to one or more additional examples of the present disclosure.

As illustrated in FIG. 8, one embodiment of an input device 112 includes an inner nozzle 802 to generate an inner cavitation jet 804 and an outer nozzle 806 to generate an outer jet 808 including a pressure that is less than the inner cavitation jet 804. The inner nozzle 802 includes a cavitator 810, a spacer 812, and a nozzle plate 814 to alter the flow of the pressurized water and create cavitation cloud 118, while the outer nozzle 806 includes geometry appropriate to lower the pressure of the water for the outer jet 808. That is, the inner nozzle 802 defines an inner channel for the inner cavitation jet 804 and an outer channel is for the outer jet 808 defined between the inner nozzle 802 and the outer nozzle 806. In some embodiments, the input device 112 may be separately supplied with low pressure water (not shown) in addition to the pressurized water supplied from the pump 164 (see FIG. 2).

FIG. 8 further shows that as the inner cavitation jet 804 and the outer jet 808 leave the input device 112, the outer jet 808 forms a shell of water (or other fluid) substantially surrounding the cavitation jet 804 and the resulting cavitation cloud 118. Abrasive media in the cavitated fluid 116 energized by the cavitation cloud 118. A portion of a rough surface 816 of the workpiece 120 may be finished and peened by particles 818 of abrasive media and the cavitation cloud 118.

With reference again to FIG. 2, the input device 112, in some embodiments, is configured for use while being in a fixed or stationary position. The workpiece 120 may be fully surrounded by and/or engulfed in the cavitation cloud 118. Alternatively, the workpiece 120 may be supported by a moving stage (e.g., stage 702 in FIG. 7) to bring new portions of the workpiece 120 into the cavitation cloud 118 as surface finishing is completed. In other embodiments, the input device 112 may be integrated into a wand or other movable structure, to allow the multi-axis robot 115 to direct the input device 112 (e.g., manually and/or automatically).

In some embodiments, the input device 112 and multi-axis robot 115 are utilized for spot-treatment or finishing of repair work. The input device 112 and multi-axis robot 115 may be configured for transport to a worksite and may include an adaptor or connector (not shown) to accept pressurized water from a variety of external systems, or may be otherwise made portable. In other embodiments, the input device 112 and multi-axis robot 115 may be appropriate for use on large-scale projects in which it would be prohibitive to submerge one or more workpieces 120 in a tank of fluid (e.g., processing tank 114).

Figure 9A:
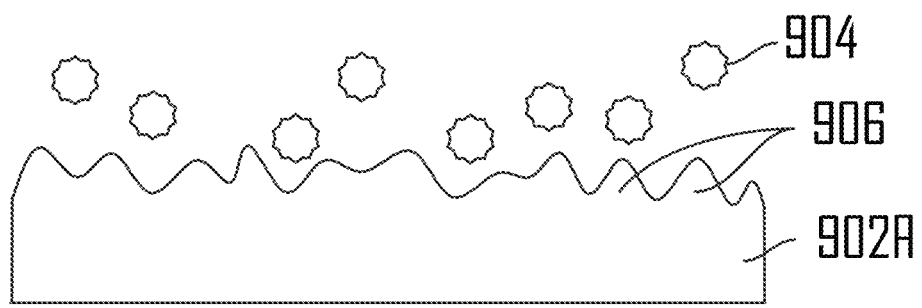
FIG. 9A illustrates an initial surface of a workpiece undergoing a fluid cavitation abrasive surface finishing process, according to one or more additional examples of the present disclosure.
Figure 9B:
FIG. 9B illustrates the finished surface of the workpiece in which the surface has been smoothed out and the workpiece is finished to a desired level of smoothness, according to one or more additional examples of the present disclosure.

FIG. 9A illustrates an initial surface 902A of the workpiece 120 undergoing a fluid cavitation abrasive surface finishing process. In FIG. 9A, a first abrasive media 904 is energized by the cavitation cloud 118 interacting with one or more protruding peaks 906 of the initial surface 902A, which removes material from the surface 902 and lowers the peak(s) 906. FIG. 9B illustrates a finished surface 902B of the workpiece 120 in which the peak(s) 906 have been smoothed out and the workpiece has been finished to a desired level of smoothness (e.g., less than 100 µM, among other levels of smoothness that are possible and contemplated herein).

The abrasive media 904 may include particles of any suitable material, any suitable ANSI grit size or sizes, and/or may include any suitable mixture of abrasive materials and/or abrasive media. Examples of the abrasive media 904 include, but are not limited to, metal, glass, ceramic, silica oxide, aluminum oxide, pumice, nut shells, corn cob, and/or plastic abrasive particles, among other materials and/or combinations of materials that are possible and contemplated herein. Each abrasive media 904 may include particles including a size in the range of about 10 ANSI grit size to about 1200 ANSI grit size, among other ANSI grit sizes greater than 1200 ANSI grit and less than 10 ANSI grit that are possible and contemplated herein. A mixture of abrasive materials and/or abrasive media may include any combination of two or more abrasive materials, a mixture of an abrasive material and a non-abrasive material, a combination of two or more abrasive materials and a non-abrasive material, a combination of an abrasive material and two or more non-abrasive materials, and a combination of two or more abrasive materials and two or more non-abrasive materials.

In one non-limiting finishing example, a metal surface with an Ra greater than 100 µM can be finished with a glass abrasive including an ANSI grit size in the range of about 100 ANSI grit to about 500 ANSI grit. In another non-limiting example, a plastic surface with an Ra of about 1,000 µM can be finished with a nut shell abrasive including an ANSI grit size of about 10 ANSI grit. In yet another non-limiting example, a plastic surface with an Ra of about 1,000 µM can be finished with a pumice abrasive including an ANSI grit size in the range of about 50 ANSI grit to about 100 ANSI grit.

Figure 11:
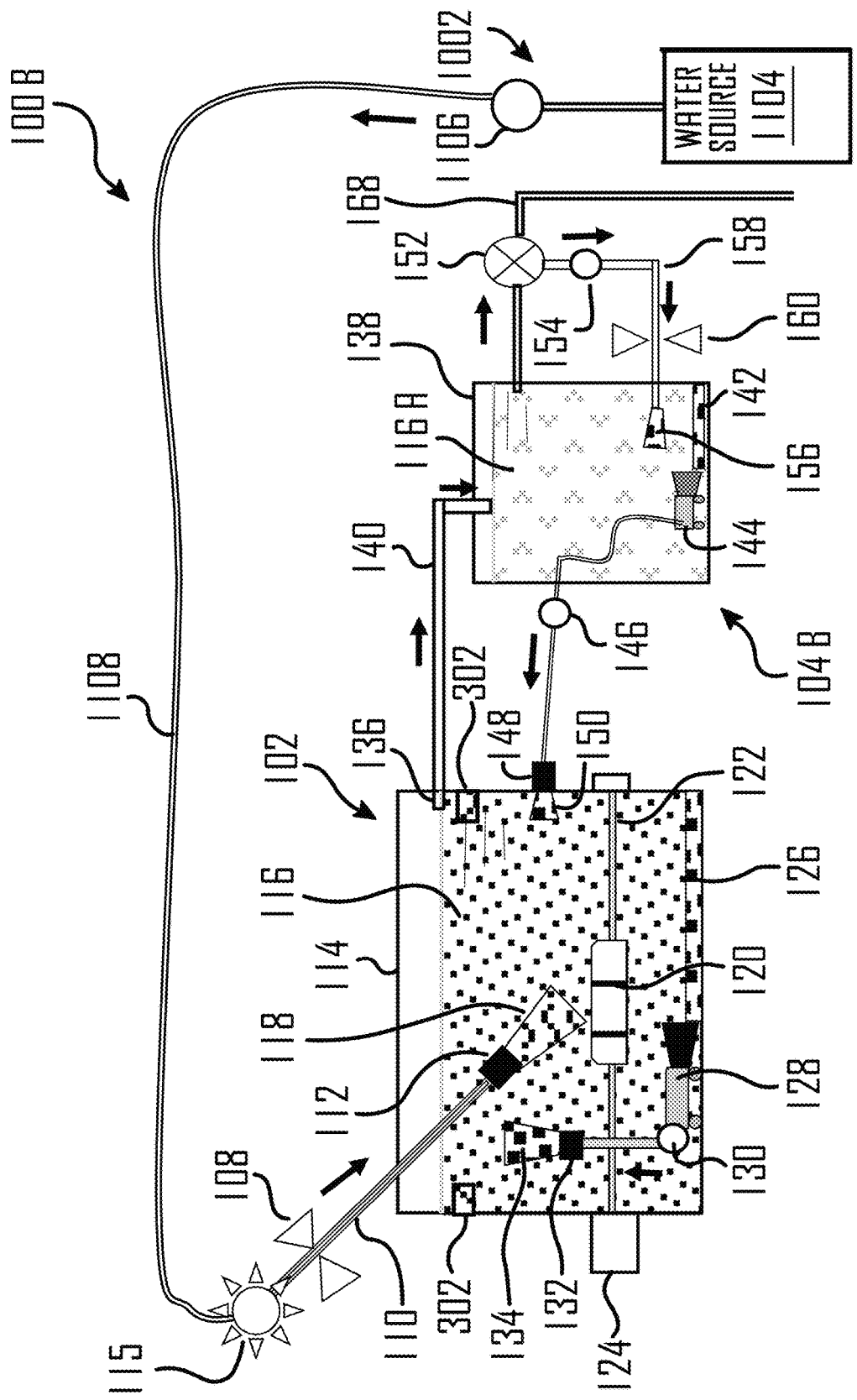
FIG. 11 is a diagram of one embodiment of the cavitation system of FIG. 10.
Figure 12:
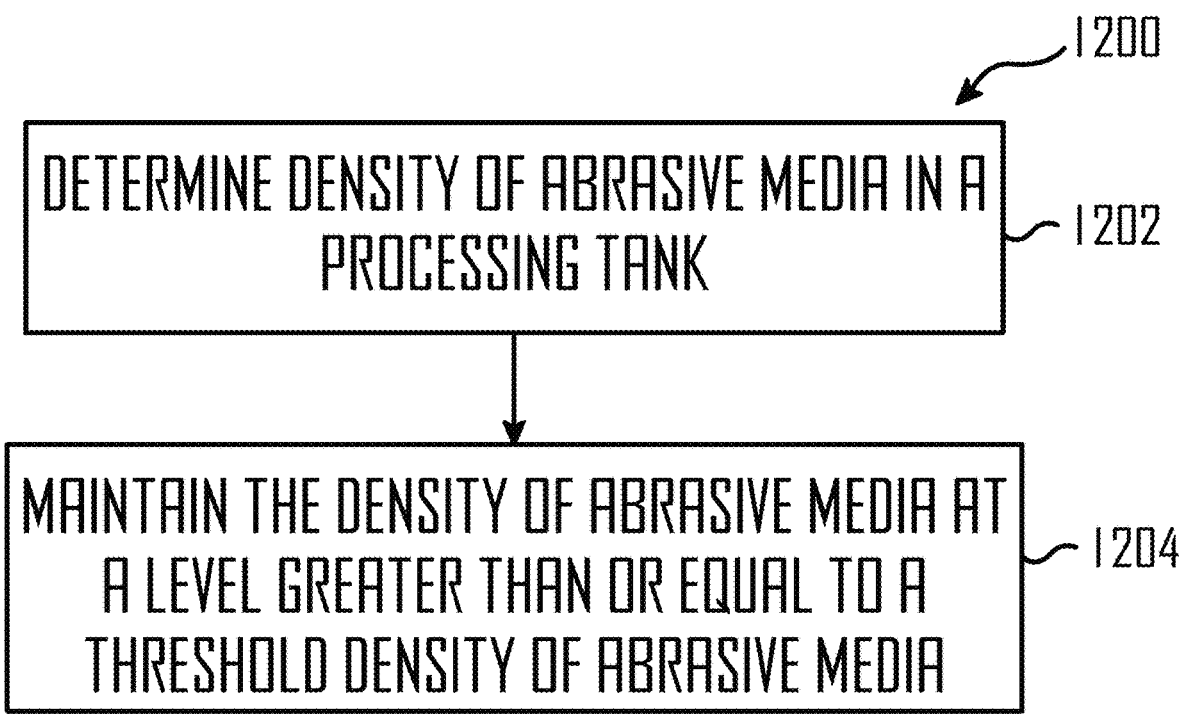
FIGS. 12 through 18 are schematic flow charts of various methods for managing abrasive media in cavitated fluid, according to various examples of the present disclosure.
Figure 13:
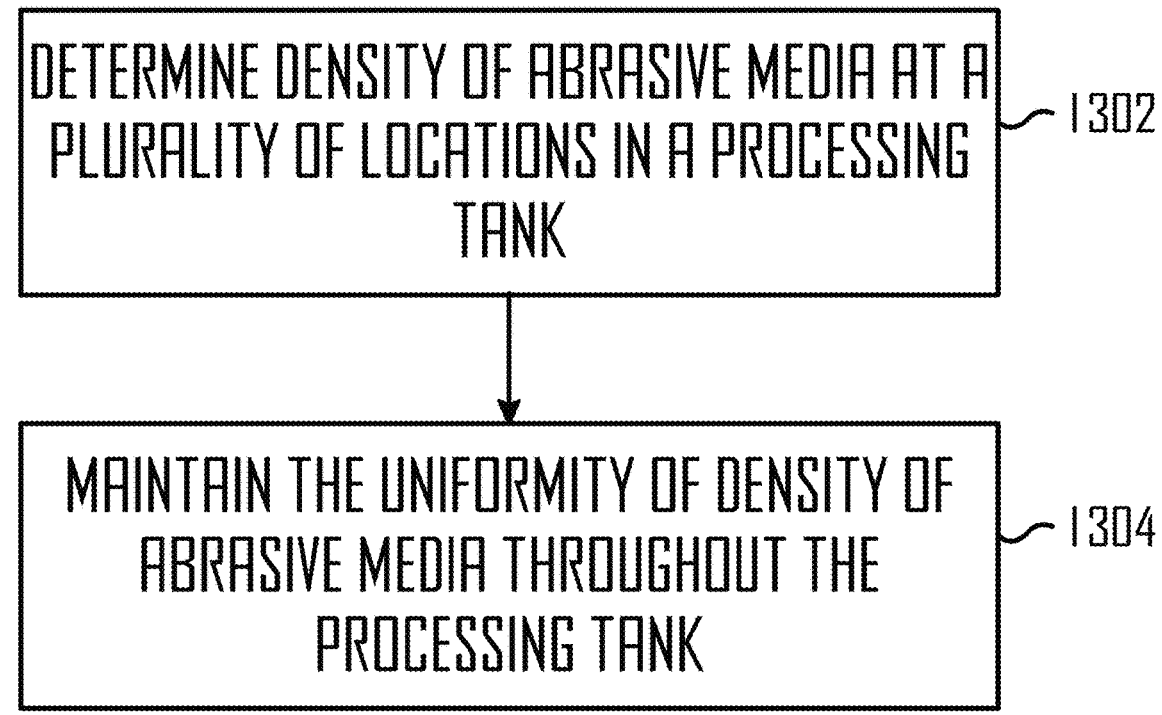
Figure 14:
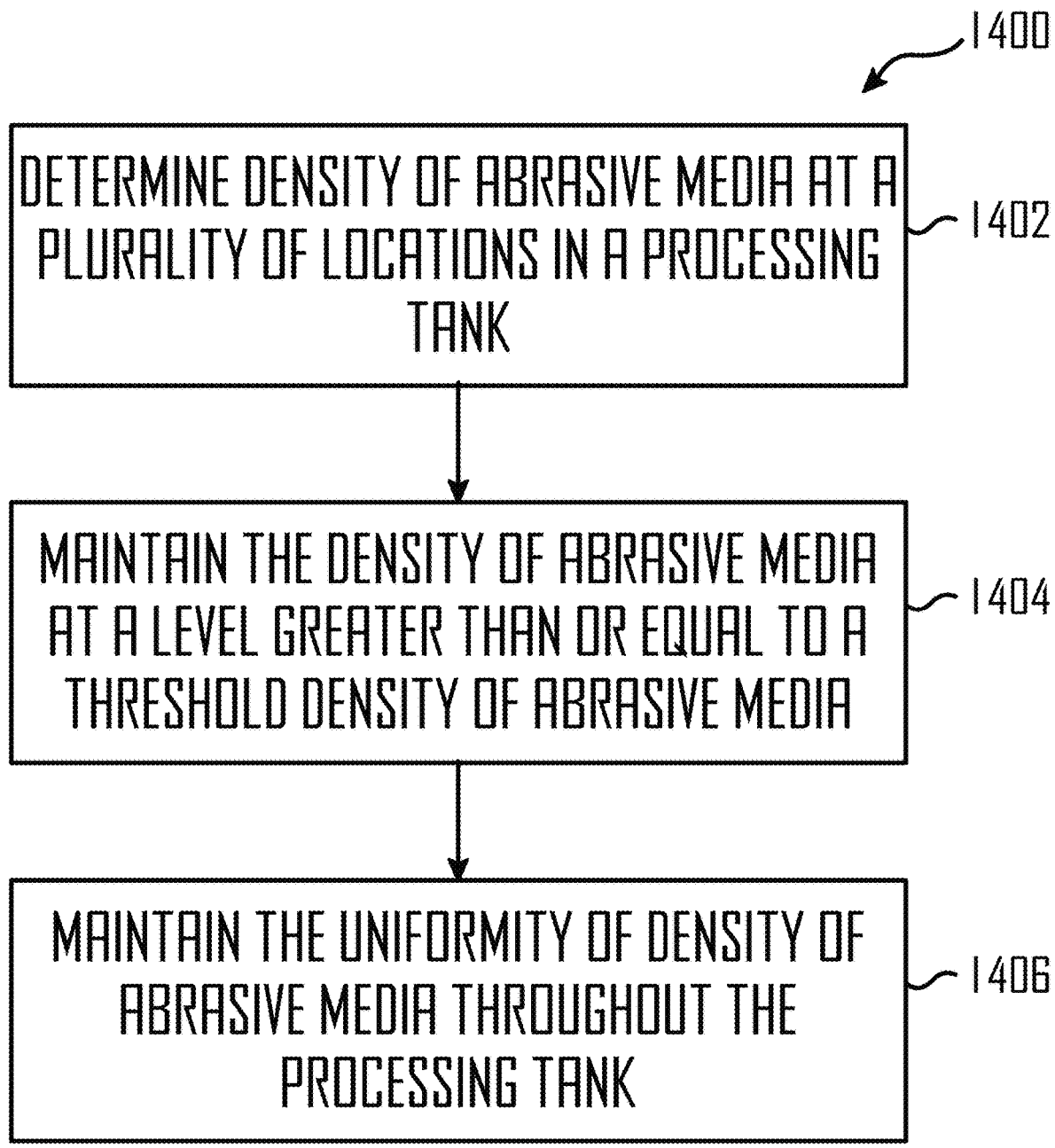
Figure 15:
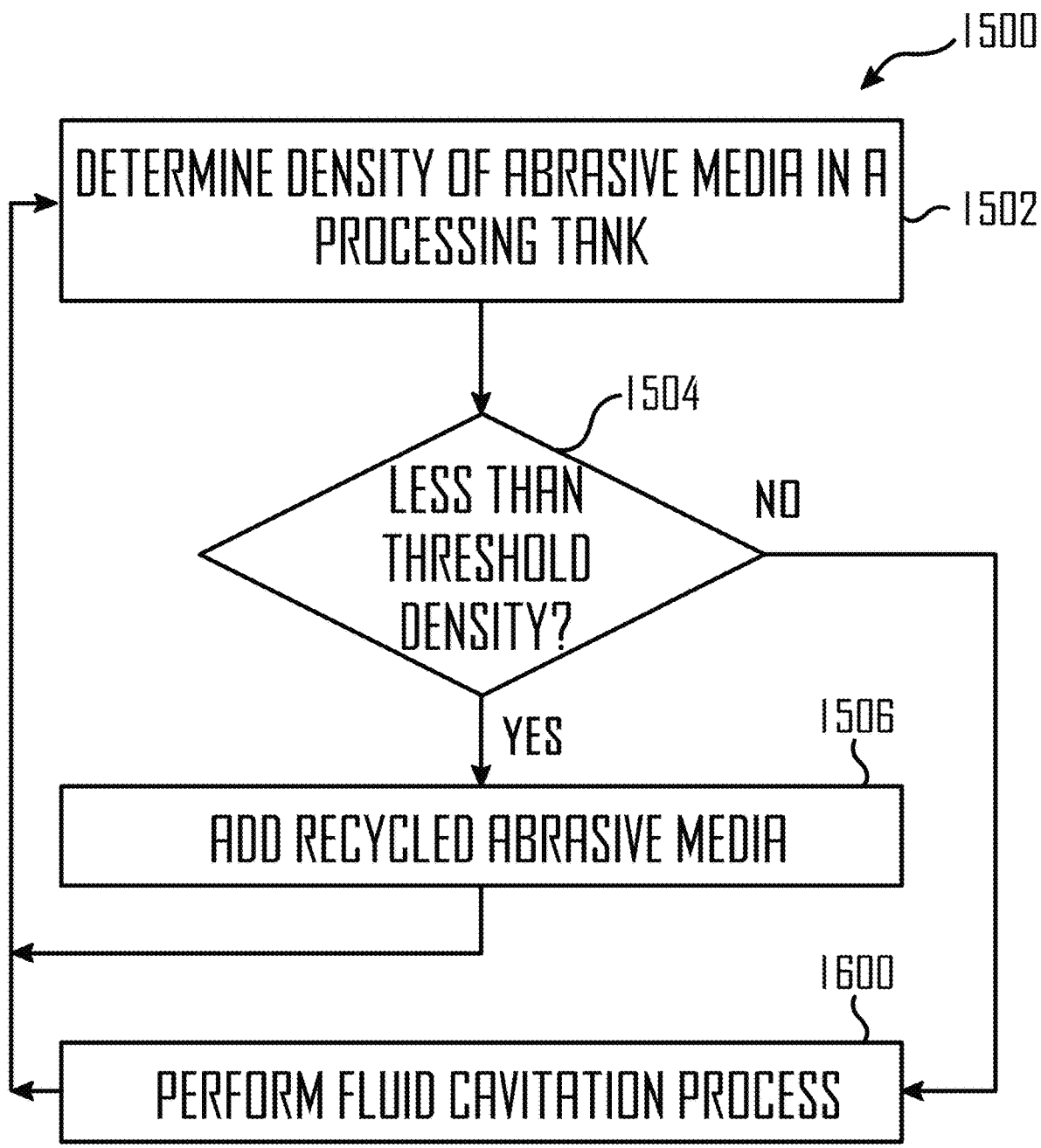
Figure 16:
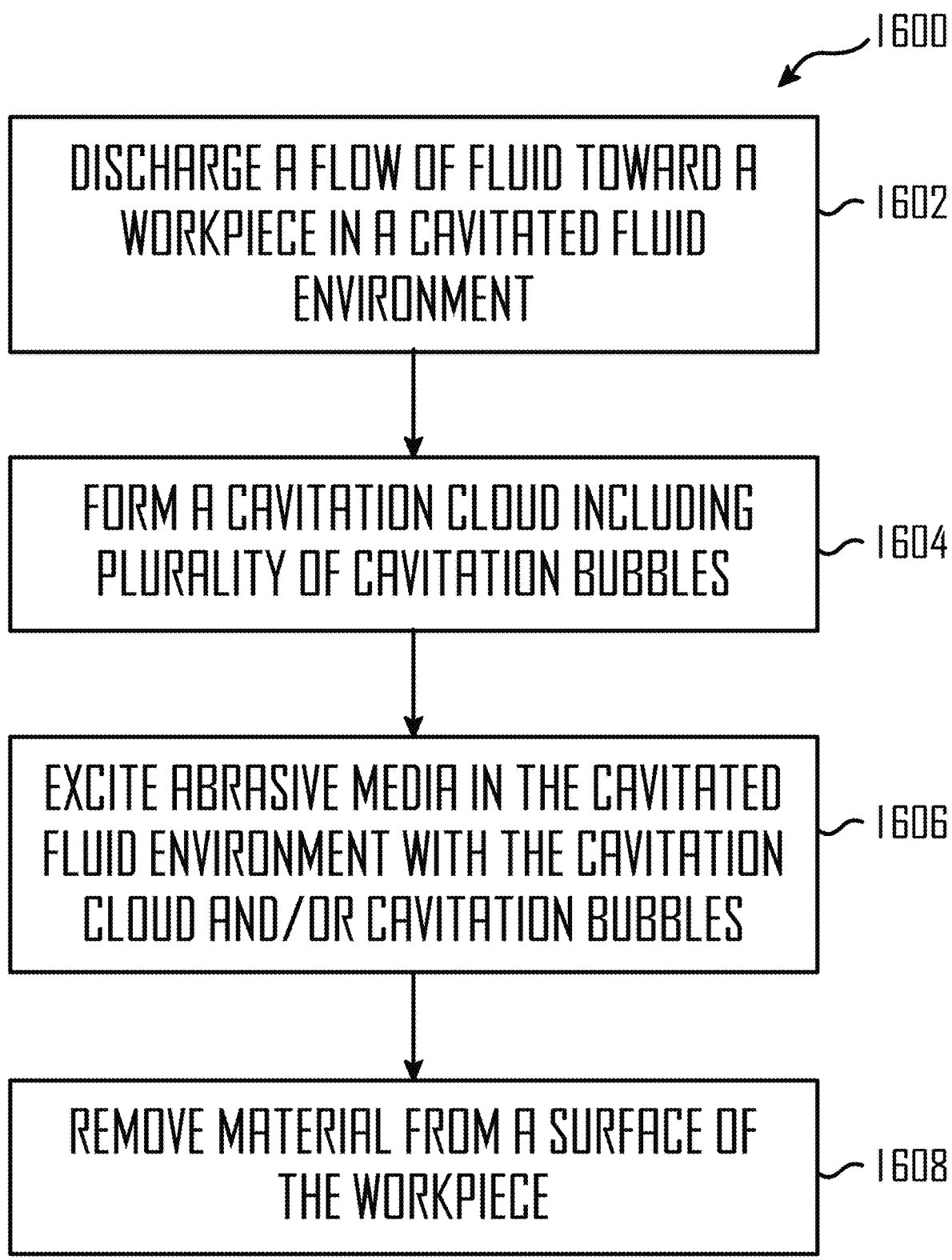
Figure 17:
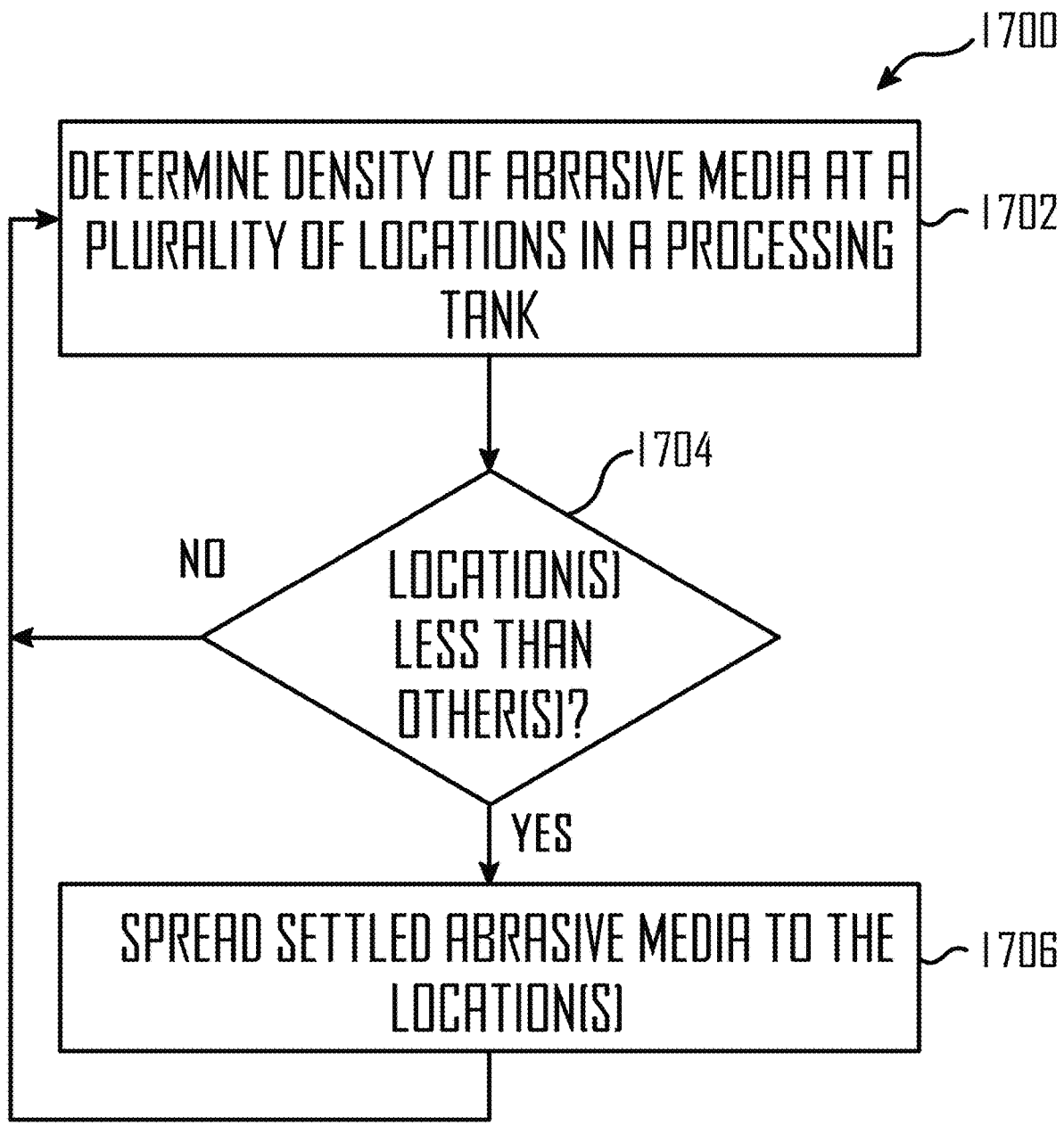
Figure 18:
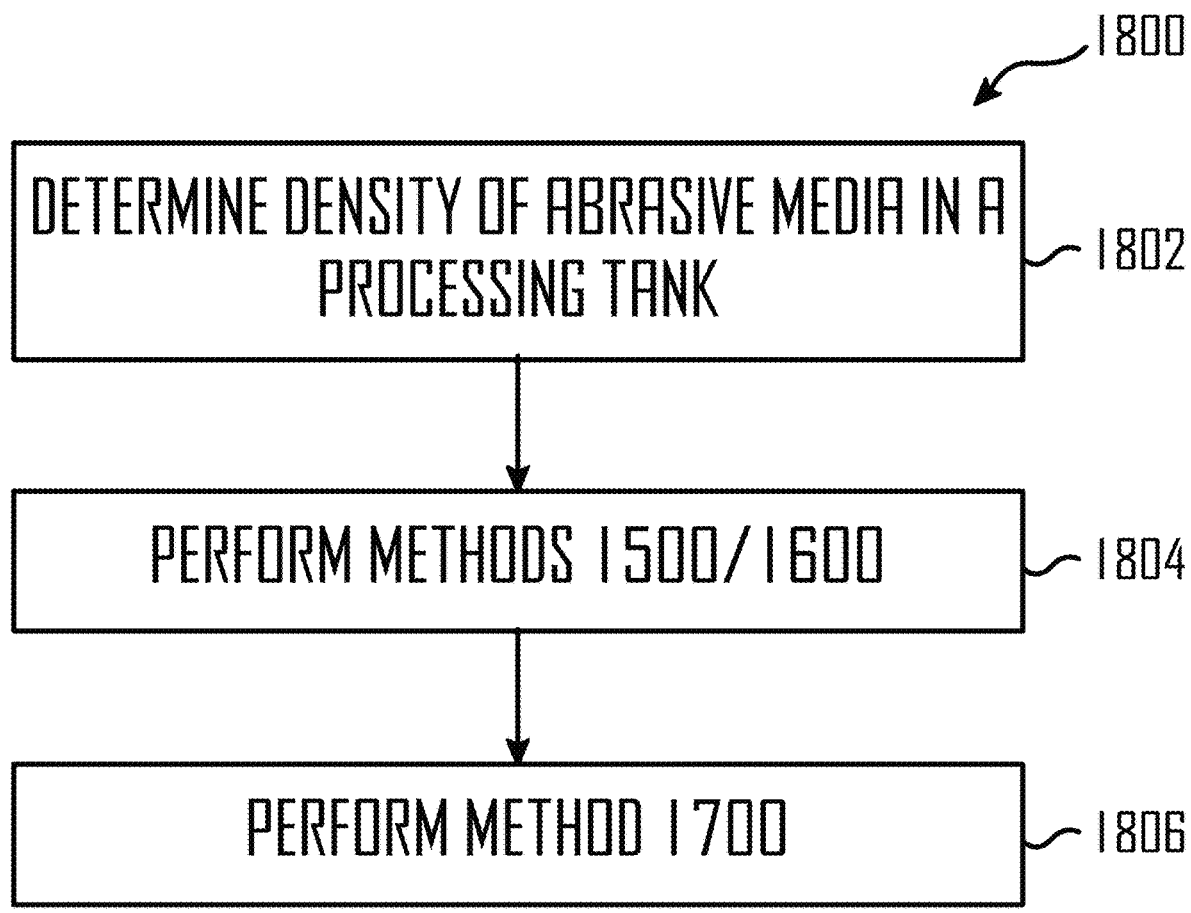

Referring to FIGS. 10 and 11, another embodiment of a fluid cavitation system 100B that can manage abrasive media in cavitated fluid is illustrated. At least in the illustrated embodiment, the fluid cavitation system 100B includes, among other components, a cavitation finishing system 102 and an abrasive media management system 106 similar to the fluid cavitation system 100A illustrated in and discussed with reference to FIGS. 1 through 9, a recirculation system 104B, and a pressurized water system 1002 coupled to and/or in communication with one another.

With reference to FIG. 11, the recirculation system 104B is configured to recirculate, redistribute, and/or recycle abrasive media to the cavitation finishing system 102. The recirculation system 104B provides, at least in part, a mechanism and/or process for managing the abrasive media levels in the processing tank 114.

The recirculation system 104B includes an overflow output 136, recirculation rank 138 that can store the overflow cavitation fluid 116A and, at times, can include the layer 142 of abrasive media on the bottom, a conduit 140, a pump 144, a pump 146, an abrasive media addition device 148 that adds abrasive media from the layer 142 to the processing tank 114 in a fan 150, a filter 152, a pump 154 that can re-introduce filtered abrasive media 156 to the recirculation tank 138 via a return line 158, and a pressure/control valve 160 similar to the recirculation system 104A illustrated in and discussed above with reference to FIGS. 1 and 2.

At least in the illustrated embodiment, the recirculation system 104B further includes an overflow output 158 coupled to the filter 152. The overflow output 158 may be any suitable overflow (e.g., a drain/conduit, aperture/conduit, funnel/conduit, etc.) that can remove filtered excess overflow cavitation fluid 116A from the recirculation tank 138.

As shown in FIG. 11, the pressurized water system 1002 includes a water source 1104 coupled to a pump 1106 (e.g., a pressure pump). The water source 1104 may include any suitable source of water, including, but not limited to a tank and/or a reservoir, etc., among other types of sources of water that are possible and contemplated herein. In various embodiments, the water source 1104 is a source of clean and/or pure water.

The pump 1106 pumps and/or supplies the water from the water source 1104 to the multi-axis robot 115 in the cavitation finishing system 102 via a conduit 1108. In this manner, the fluid cavitation system 100B defines an open loop system.

With reference to FIGS. 12 through 18, FIGS. 12 through 18 are flow diagrams illustrating various embodiments of a method 1200, 1300, 1400, 1500, 1600, 1700, and 1800 for managing abrasive media in cavitated fluid. The various methods 800, 302, 1000, 1100 By managing the abrasive media in a cavitated fluid 116, a fluid cavitation process can be performed more efficiently because the cavitated fluid environment can include the proper density of abrasive media and/or a uniform density of abrasive media throughout a processing tank 114.

The method 1200 (see FIG. 12) begins by the processor 304 determining the density of abrasive media in a cavitated fluid 116 stored in a processing tank 114 (block 1202). The density may be determined at one or more locations in the processing tank 114. Further, the density of abrasive media can include the average, median, or mode density of abrasive media in the processing tank 114.

The processor 304 maintains the density of abrasive media at a level that is greater than or equal to a threshold density of abrasive media (block 1204). To maintain the density of abrasive media at a level greater than or equal to the threshold density of abrasive media, the processor 304 can, as needed, add recycled abrasive media to the processing tank 114.

The method 1300 (see FIG. 13) begins by the processor 304 determining the density of abrasive media in a cavitated fluid 116 at a plurality of different locations in a processing tank 114 (block 1302). The density may be determined at the different locations using a set of sensors 302.

The processor 304 maintains the uniformity of density of abrasive media throughout the processing tank 114 (block 1304). To maintain the uniformity of density of abrasive media throughout the processing tank 114, the processor 304 can, as needed, spread settled abrasive media to one or more locations in the processing tank 114.

The method 1400 (see FIG. 14) begins by the processor 304 determining the density of abrasive media in a cavitated fluid 116 stored in a processing tank 114 (block 1402). The density may be determined at a plurality of different locations in the processing tank 114. Further, the density of abrasive media can include the average, median, or mode density of abrasive media in the processing tank 114.

The processor 304 maintains the density of abrasive media at a level that is greater than or equal to a threshold density of abrasive media (block 1404). To maintain the density of abrasive media at a level greater than or equal to the threshold density of abrasive media, the processor 304 can, as needed, add recycled abrasive media to the processing tank 114.

The processor 304 further maintains the uniformity of density of abrasive media throughout the processing tank 114 (block 1406). To maintain the uniformity of density of abrasive media throughout the processing tank 114, the processor 304 can, as needed, spread settled abrasive media to one or more locations in the processing tank 114.

The method 1500 (see FIG. 15) begins by the processor 304 determining the density of abrasive media in a cavitated fluid 116 stored in a processing tank 114 (block 1502). The density may be determined at one or more locations in the processing tank 114. Further, the density of abrasive media can include the average, median, or mode or other calculated representation of the density of abrasive media in the processing tank 114.

The processor 304 determines whether the determined density of abrasive media in the processing tank 114 is less than a threshold density of abrasive media (block 1504). If the determined density of abrasive media in the processing tank 114 is less than a threshold density of abrasive media (e.g., a "YES" in block 1504), the processor 304 adds recycled abrasive media (e.g., from a recirculation system 104) to the processing tank 114 (block 1506) and continues to determine the density of abrasive media in the cavitated fluid 116 stored in the processing tank 114 in block 1502. If the determined density of abrasive media in the processing tank 114 is greater than or equal to the threshold density of abrasive media (e.g., a "NO" in block 1504), the processor 304 performs a fluid cavitation process (block 1600), one embodiment of which is illustrated in and discussed with reference to FIG. 16.

The method 1600 (see FIG. 16) begins by a processor 304 discharging a flow of fluid (e.g., water) toward a workpiece 120 in an environment (e.g., a processing tank 114) of cavitated fluid 116 (block 1602). The fluid in combination with the cavitated fluid 116 forms a cavitation cloud 118 including a plurality of cavitation bubbles (block 1604).

The cavitation cloud 118 and/or cavitation bubbles excite abrasive media in the cavitated fluid 116 in the environment (block 1606). The abrasive media excited by the cavitation cloud 118 and/or cavitation bubbles are utilized to remove material from a surface of the workpiece 120 (block 1608).

The method 1700 (see FIG. 17) begins by the processor 304 determining the density of abrasive media in a cavitated fluid 116 in a plurality of different locations within a processing tank 114 (block 1702). The density may be determined at the different locations using a set of sensors 302.

The processor 304 determines whether one or more locations include a density of abrasive media that is less than the density of abrasive media one or more other locations (block 1704). If the density of abrasive media at one or more locations is less than the density of abrasive media of the other location(s) (e.g., a "YES" in block 1704), the processor 304 spreads settled abrasive media (e.g., via an abrasive media distribution device 132) to the location(s) (block 1706) to increase the uniformity of abrasive media throughout the processing tank 114. If the density of abrasive media at the different locations is approximately equal (e.g., a "NO" in block 1704), the processor 304 continues to determine the density of abrasive media in the cavitated fluid 116 at the plurality of different locations in block 1702.

The method 1800 (see FIG. 18) begins by the processor 304 determining the density of abrasive media in a cavitated fluid 116 stored in a processing tank 114 (block 1802). The density may be determined at one or more locations in the processing tank 114. Further, the density of abrasive media can include the average, median, or mode density of abrasive media in the processing tank 114.

The processor 304 performs the method 1500, which may also include performing the method 1600 (block 1804), each of which is discussed elsewhere herein. The processor 304 further performs the method 1700 (block 1806), which is discussed elsewhere herein.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, Programmable Logic Computer (PLC) ladder logic, or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for managing abrasive media in a cavitated fluid within a processing tank for use in performing a cavitation peening technique on a workpiece in the processing tank, the system comprising:
a set of sensors in communication with the cavitated fluid in the processing tank;
a processor coupled to the set of sensors, the processor configured to:
determine a density of an abrasive media in the cavitated fluid in the processing tank in response to input from the set of sensors, and
facilitate maintaining the density of abrasive media in the cavitated fluid in the processing tank at a level that is greater than or equal to a threshold level of abrasive media; and
an abrasive media addition device in communication with the processor and in fluid communication with the processing tank, the abrasive media addition device configured to add recycled abrasive media to the cavitated fluid in the processing tank,
wherein:
in determining the density of abrasive media, the processor is configured to calculate an average density of abrasive media in the cavitated fluid; and
the processor is further configured to command the abrasive media addition device to add the recycled abrasive media to the processing tank to increase the density of abrasive media in the cavitated fluid in response to determining that the average density of abrasive media is less than the threshold density of abrasive media.

2. The system according to claim 1, further comprising:
a recirculation tank;
a conduit fluidically coupling the processing tank and the recirculation tank so that excess cavitation fluid in the processing tank flows into the recirculation tank as overflow cavitation fluid, wherein the abrasive media addition device fluidically couples the processing tank and the recirculation tank so that abrasive media from a first layer of abrasive media on a bottom of the recirculation tank is added to the cavitation fluid in the processing tank;
a cavitation nozzle in the processing tank and fluidically coupled to the overflow cavitation fluid in the recirculation tank so that filtered water from the overflow cavitation fluid in the recirculation tank is injected into the processing tank as a cavitating jet of water; and
an abrasive media distribution device in the processing tank and configured to distribute abrasive media from a second layer of abrasive media on a bottom of the processing tank into the cavitation fluid in the processing tank.

3. The system of claim 2, further comprising a first pump in the recirculation tank, wherein the first pump is configured to pump the abrasive media from the first layer of abrasive media on the bottom of the recirculation tank to the abrasive media addition device.

4. The system of claim 3, further comprising a second pump in the processing tank, the second pump is configured to pump the abrasive media from the second layer of abrasive media on the bottom of the processing tank to the cavitation fluid in the processing tank.

5. The system of claim 3, wherein the abrasive media addition device is non-movably fixed relative to the processing tank.

6. The system of claim 3, wherein the abrasive media distribution device is movable relative to the processing tank so that the abrasive media from a second layer of abrasive media on a bottom of the processing tank can be distributed to multiple locations within the processing tank.

7. The system of claim 3, wherein:
the abrasive media distribution device is movable relative to the processing tank so that the abrasive media from a second layer of abrasive media on a bottom of the processing tank can be distributed to multiple locations within the processing tank; and the first pump is movable relative to the recirculation tank.

8. The system according to claim 1, further comprising a recirculation system coupled to the processing tank, the recirculating system configured to:
receive overflow cavitation fluid from the processing tank; and
supply abrasive media in the overflow cavitation fluid back to the processing tank for re-use in the cavitated fluid.

9. The system according to claim 8, further comprising an input device configured to remove material from a surface of the workpiece, wherein:
the input device is coupled to the recirculation system, and
the recirculation system is configured to supply water to the input device.

10. The system according to claim 8, further comprising:
an input device configured to remove material from a surface of the workpiece; and
a water source coupled to the input device.

11. The system according to claim 1, wherein the processor, to facilitate maintaining the density of abrasive media in the cavitated fluid in the processing tank, is configured to:
facilitate adding abrasive media to the cavitated fluid in response to detecting that a current level of abrasive media in the cavitated fluid is less than the threshold level of abrasive media; and
maintain the current level of abrasive media in the cavitated fluid in response to detecting that the current level of abrasive media in the cavitated fluid is greater than or equal to the threshold level of abrasive media.

12. The system according to claim 1, further comprising an abrasive media distribution device within the processing tank, the abrasive media distribution device configured to spread settled abrasive media in the processing tank to the cavitated fluid to increase a uniformity of abrasive media throughout the processing tank.

13. The system according to claim 1, wherein the set of sensors is further configured to facilitate maintaining a uniform density of abrasive media in the cavitated fluid throughout the processing tank.

14. A system for managing abrasive media in a cavitated fluid within a processing tank for use in performing a cavitation peening technique on a workpiece in the processing tank, the system comprising:
a set of sensors in communication with the cavitated fluid in the processing tank;
a processor coupled to the set of sensors, the processor configured to:
determine a density of an abrasive media in the cavitated fluid in the processing tank in response to input from the set of sensors, and
facilitate maintaining the density of abrasive media in the cavitated fluid in the processing tank at a level that is greater than or equal to a threshold level of abrasive media
wherein:
the set of sensors comprises a plurality of sensors;
each sensor is in communication with the cavitated fluid at a different location in the processing tank;
each sensor is configured to determine a density of abrasive media in the cavitated fluid at a respective location in the processing tank;

the system further comprises an abrasive media distribution device within the processing tank;
the abrasive media distribution device is in communication with the processor;
the processor is configured to determine a location in the processing tank that includes a density of abrasive media that is less than another location in the processing tank; and
the abrasive media distribution device is configured to spread the abrasive media at the location to increase a density of abrasive media in the cavitated fluid at the location.

15. The system according to claim 14, further comprising a recirculation system coupled to the processing tank, the recirculating system configured to:
receive overflow cavitation fluid from the processing tank; and
supply abrasive media in the overflow cavitation fluid back to the processing tank for re-use in the cavitated fluid.

16. The system according to claim 15, further comprising an input device configured to remove material from a surface of the workpiece, wherein:
the input device is coupled to the recirculation system, and
the recirculation system is configured to supply water to the input device.

17. The system according to claim 15, further comprising:
an input device configured to remove material from a surface of the workpiece; and
a water source coupled to the input device.

18. The system according to claim 14, wherein the processor, to facilitate maintaining the density of abrasive media in the cavitated fluid in the processing tank, is configured to:
facilitate adding abrasive media to the cavitated fluid in response to detecting that a current level of abrasive media in the cavitated fluid is less than the threshold level of abrasive media; and
maintain the current level of abrasive media in the cavitated fluid in response to detecting that the current level of abrasive media in the cavitated fluid is greater than or equal to the threshold level of abrasive media.

19. The system according to claim 14, wherein the abrasive media distribution device is further configured to spread settled abrasive media in the processing tank to the cavitated fluid to increase a uniformity of abrasive media throughout the processing tank.

20. The system according to claim 14, wherein the set of sensors is further configured to facilitate maintaining a uniform density of abrasive media in the cavitated fluid throughout the processing tank.

* * * * *